United States Patent [19]

Ooi et al.

[11] Patent Number: 5,347,636
[45] Date of Patent: Sep. 13, 1994

[54] DATA PROCESOR WHICH EFFICIENTLY ACCESSES MAIN MEMORY AND INPUT/OUTPUT DEVICES

[75] Inventors: Yasushi Ooi; Yoshiyuki Miki, both of Tokyo, Japan

[73] Assignee: NEC Corporation, Tokyo, Japan

[21] Appl. No.: 965,534

[22] Filed: Oct. 23, 1992

Related U.S. Application Data

[63] Continuation of Ser. No. 698,197, May 6, 1991, abandoned, which is a continuation of Ser. No. 517,418, May 2, 1990, abandoned, which is a continuation of Ser. No. 364,313, Jun. 2, 1989, abandoned, which is a continuation of Ser. No. 228,869, Aug. 5, 1988, abandoned, which is a continuation of Ser. No. 928,510, Nov. 10, 1986, abandoned.

[30] Foreign Application Priority Data

| Nov. 8, 1985 | [JP] | Japan | 60-250054 |
| Nov. 8, 1985 | [JP] | Japan | 60-250061 |
| May 27, 1986 | [JP] | Japan | 61-122658 |

[51] Int. Cl.$^5$ .............................................. G06F 15/00
[52] U.S. Cl. ...................................... 395/275; 395/400
[58] Field of Search ............... 395/275, 400, 425, 775, 395/800

[56] References Cited

U.S. PATENT DOCUMENTS

| 3,781,808 | 12/1973 | Ahearn et al. | 364/200 |
| 3,829,840 | 8/1974 | Burk et al. | 364/200 |
| 3,909,798 | 9/1975 | Wallach et al. | 340/172.5 |
| 4,068,303 | 1/1978 | Morita | 364/200 |
| 4,376,297 | 3/1983 | Anderson et al. | 364/200 |
| 4,481,573 | 11/1984 | Fukunaga et al. | 364/200 |
| 4,513,369 | 4/1985 | Sato | 364/200 |
| 4,520,441 | 5/1985 | Bandoh et al. | 364/200 |
| 4,654,790 | 3/1987 | Woffinden | 364/200 |
| 4,682,281 | 7/1987 | Woffinden et al. | 364/200 |
| 4,774,659 | 9/1988 | Smith et al. | 364/200 |

OTHER PUBLICATIONS

Yamamura and Favor, Z80,000 32-Bit Microprocessor, Wescon '83, pp. 1-3.
Donald Alpert, Powerful 32-Bit Micro Includes Memory Management, Computer Design, Oct. 1983, pp. 213-220.
Z80,000 CPU Preliminary Product Specification, Zilog Inc. 1983 pp. 1-47.

Primary Examiner—Heather R. Herndon
Attorney, Agent, or Firm—Foley & Lardner

[57] ABSTRACT

A data processor which includes at least a central processing unit adapted to execute virtual memory management. The central processing unit internally includes a translation lookaside buffer (TLB) for translating a given virtual address into a corresponding real address. The TLB also generates a distinction signal indicating whether the translated real address designates a main memory or an external input/output device. In response to the distinction signal, a control signal generator outputs a set of input/output control signals for the access of the type designated by the distinction signal.

8 Claims, 18 Drawing Sheets

FIGURE 9A
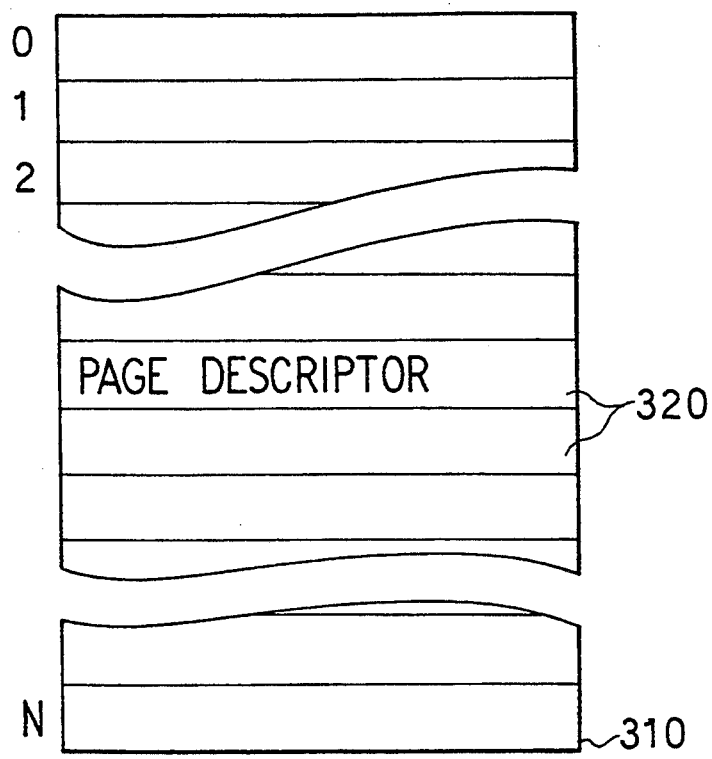
FIGURE 9B  PAGE DESCRIPTOR
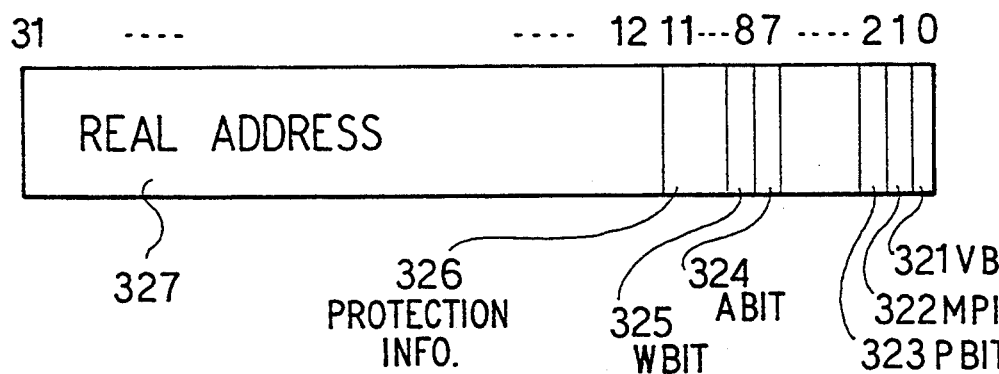

DATA PROCESOR WHICH EFFICIENTLY ACCESSES MAIN MEMORY AND INPUT/OUTPUT DEVICES

This application is a continuation of application Ser. No. 07/698,197, filed May 6, 1991, now abandoned, which is a continuation of 07/517,418, filed May 2, 1990, now abandoned, which is a continuation of 07/364,313, filed June 2, 1989, now abandoned, which is a continuation of 07/228,869, filed Aug. 5, 1988, now abandoned, which is a continuation of parent application Ser. No. 06/928,510, filed Nov. 10, 1986, now abandoned.

BACKGROUND OF THE INVENTION

1. Field of the Invention

The present invention relates to a central processing unit for use in data processors, and more particularly to an input/output control mechanism for central processing units of the pipelined architecture.

2. Description of Related Art

Heretofore, a central processing unit (called "CPU" hereinafter) has been adapted to access to an external input/output device (called "I/O device" hereinafter) by the following two methods: The first method is that when the CPU executes an input/output (I/O) instruction, data is transferred between the CPU and a selected I/O device in accordance with the I/O instruction and a read/write control signal. The second method is a so-called "memory mapped I/O", in which the addresses of I/O devices are allocated to a portion of the address space prepared for a main memory, and when instructions such as read/write instructions and arithmetic and logic instructions are executed, if an address is allocated to an I/O device, data is transferred between the CPU and the indicated I/O device in accordance with a read/write control signal.

In the memory mapped I/O as mentioned above, it is possible to designate not only a main memory but also an I/O device by using operands such as read/write instructions, ordinary arithmetic and logical operation instructions and data transfer instructions. Therefore, this is very effective in elevating the performance and function of microprocessors.

However, the memory mapped I/O has encountered the following problems which have recently been caused by speed-up of processors themselves. In low speed CPUs, it is possible to access both a main memory and I/O devices in similar input/output control manners. But, such access is not possible in high speed CPUs which operate at a clock frequency of not less than 8 MHz. This is true because, a high speed access to a main memory can be realized by adopting new architecture such interleaving, Nibble mode access, and page mode access, and in contrast, the I/O device cannot intrinsically adopt such new architectures. As a result, various differences are caused between the access to the main memory and the access to the I/O devices in the timings such as cycle time and recover time and in the access method, and therefore, the same control system cannot be applied both to the access to the main memory and the access to the I/O devices. Thus, the CPU of the memory mapped I/O system needs additional peripheral circuits in order to overcome the above problems. Namely, the required hardware becomes more complicated.

Specifically, in case that the page mode access is adopted in the CPU, which can designate the operand address by units of a byte, an operand is often bridged over a plurality of pages. In such a case, the CPU has to access to the I/O device in a manner different from that of the access to the memory.

Furthermore, the CPU of the memory mapped I/O system cannot internally discriminate between the main memory space and the I/O space. The CPU does not have the internal capability of interrupting the instruction execution in the course of access to the I/O device and then executing an internal interruption (this is called "I/O access trap function"). The CPU also cannot allow a user to settle a privileged level dedicated for the I/O access (this is called "I/O privileged level designation function"). If the CPU is required to have the above functions, the CPU also needs additional peripheral circuits and special interruption processing functions.

As mentioned above, in the memory mapped I/O system, since a portion of the address space is used as the I/O space, the entire address space cannot be used for the main memory. Therefore, if a large I/O space is reserved, for example, if the I/O space has the same capacity as that of the main memory so that the I/O space and the memory space can be distinguished by the most significant bit of the address, it is sufficient that a small-sized external address decoder is provided for distinguishing between the I/O space and the memory space. In this case, the address decoder itself for such a purpose can be omitted. In this case, however, the main memory becomes too small, and therefore, cannot have a sufficient flexibility or degree of freedom. On the other hand, if only a small I/O space is provided in comparison with the whole of the address space, the utilization efficiency and the degree of freedom in the main memory space and the I/O space are increased, but a large-scaled address decoder is required. In addition, in order to enable the I/O space to be allocated to a voluntary portion of the address space, the address decoder has to be not only large-scaled but also very complicated.

As is apparent from the above description, in the memory mapped I/O system, the proportion of the I/O space to the whole of the address space is in a trade-off relation to the scale of the external address decoder. This is not convenient to the structure of the system.

Moreover, a so-called pipeline architecture is well known as one means for parallel instruction execution which enables one to elevate the performance of the CPU. In this pipelined design, the CPU is ordinarily divided into several units so that respective steps in executing an instruction are carried out in separate units within the CPU to perform the instruction. For example, in an instruction decoding unit, a given instruction is converted into the form which can be directly executed in an instruction execution unit. In an effective address computation unit, thereafter, an effective address (or virtual address) is computed from a displacement value, an index value, a base value, etc., and, the effective address is translated into a real address in an address translation unit, while the second instruction is converted in the instruction decoding unit. Then, a read/write operation to the main memory or the I/O device is controlled in a main memory control unit, and on the other hand, the operation is executed by an instruction execution unit on the basis of the result obtained from the instruction decoding unit. At this time, the third instruction is converted in the instruction decoding unit, and the second instruction is subjected to the address translation.

As seen from the above, the pipelined architecture can be compared to an automobile assembly line. Specifically, an operand reading instruction is executed through the instruction decoding, the effective address computation and address translation, the operand reading, and the instruction execution in the named order. On the other hand, an operand writing instruction is executed through the instruction decoding, the effective address computation and address translation, the instruction execution and the operand writing in the named order. The above mentioned processing steps are actually executed in parallel as shown in FIG. 1 in the pipelined operation. Therefore, the total time of operation is shortened, with the result that the execution time of each instruction is apparently minimized. Accordingly, the CPU can operate at a high speed.

However, as seen from FIG. 1, the operand reading for a reading instruction is often executed prior to the operand writing for a writing instruction, although the writing instruction is given ahead of the reading instruction. On the other hand, when the writing is performed in the I/O device, the status and control of the I/O device are changed, and so, the succeeding reading from the I/O device is changed. As a result, as mentioned above, if the sequence of actual accesses to the I/O device is reversed in comparison with the sequence of I/O instructions to be executed, the control of the I/O device will get out of order.

In this circumstance, there has recently been proposed a CPU provided with a virtual memory management mechanism, which has removed some of problems in memory management. Namely, a voluntary portion of a virtual memory space can be allocated to I/O devices and the remaining portion can be used as a main memory. In addition, it is possible to control the access right to the I/O devices, similarly to the case for the main memory, and also to protect the I/O device from illegal access.

However, if the real address space is of the memory mapped I/O system, problems attributable to the memory mapped I/O system are still present.

For reference, if the virtual memory management is performed in the CPU which does not have the memory mapped I/O system, the CPU can internally distinguished between the main memory access and the I/O access, and therefore, it is possible to obtain the I/O access trap function and the I/O privileged level designation function. However, since the real address space does not include I/O addresses, one cannot designate I/O devices by instruction operands. In addition, the access right to the I/O devices cannot be controlled by the virtual memory management mechanism, and so, flexible protection for I/O devices is difficult to realize.

SUMMARY OF THE INVENTION

Accordingly, it is an object of the present invention to provide a data processor which eliminates some of the above mentioned drawbacks in conventional data processors.

Another object of the present invention is to provide a data processor which has the memory mapped I/O system and which can internally distinguish the main memory space and the I/O space.

Still another object of the present invention is to provide a data processor of the memory mapped I/O architecture which can interrupt the execution of instruction in the course of the access to the I/O device and can also perform an internal interrupt in such a situation.

A further object of the present invention is to provide a data processor of the memory mapped I/O architecture which enables a user to settle a privileged level for executing the I/O access.

A still further object of the present invention is to provide a data processor of the memory mapped I/O architecture which can effectively access the I/O device even if the CPU operates at a high speed.

A further object of the present invention is to provide a data processor of the memory mapped I/O architecture which can generate special timing and input/output control signals in order to make it possible to access the I/O device even if architectures such as interleaving, Nibble mode access, and page mode access are adopted for a high speed access to the main memory.

A still further object of the present invention is to provide a data processor in which the CPU internally comprises a virtual memory management mechanism and realizes the memory mapped I/O in the internal virtual memory space, so that software is simplified and the CPU can distinguish between the main memory space and the I/O space.

A further object of the present invention is to provide such a data processor which allows a voluntary portion of a virtual memory space to be freely allocated to I/O devices.

A still further object of the present invention is to provide a pipelined data processor of the memory mapped I/O system which can control the access to the I/O device in such a manner that the sequence of the actual accesses to the I/O device is consistent with the sequence of the I/O instructions.

The above and other objects of the present invention are achieved in accordance with the present invention by a data processor which includes at least a central processing unit adapted to execute a virtual memory management, wherein the improvement comprises:

address translation means internally provided in the central processing unit for translating a given virtual address into a corresponding real address;

means associated with the address translation means for generating a distinction signal indicating whether the translated real address designates a main memory or an external input/output device; and means receiving the distinction signal for generating a set of input/output control signals to control an external I/O device.

In one embodiment, the address translation means includes a translation lookaside buffer adapted to store a plurality of data sets, each of which contains one virtual address, a corresponding real address and access distinction information which indicates whether the real address is allocated to the main memory or an external input/output device.

Specifically, the translation lookaside buffer has an input for receiving the given virtual address, a first output for supplying a corresponding real address, and a second output for the distinction signal. The translation lookaside buffer also has a plurality of blocks each of which includes a virtual address data register, a comparator having a first input coupled to the virtual address register and a second input coupled commonly to the input of the translation lookaside buffer, a real address register coupled through a first transfer gate commonly to the first output of the translation lookaside buffer, and a distinction information register coupled through a second transfer gate commonly to the second output of the translation lookaside buffer, the first and second transfer gates being turned on when the associated comparator detects coincidence between the first and second input thereof.

The above and other objects, features and advantages of the present invention will be apparent from the following description of preferred embodiments of the invention with reference to the accompanying drawings.

BRIEF DESCRIPTION OF THE DRAWINGS

FIG. 9A shows one example of the page table used in the present invention;

FIG. 9B shows one example of the page descriptor contained in the page table shown in FIG. 9A;

DETAILED DESCRIPTION OF THE PREFERRED EMBODIMENTS

Figure 1:
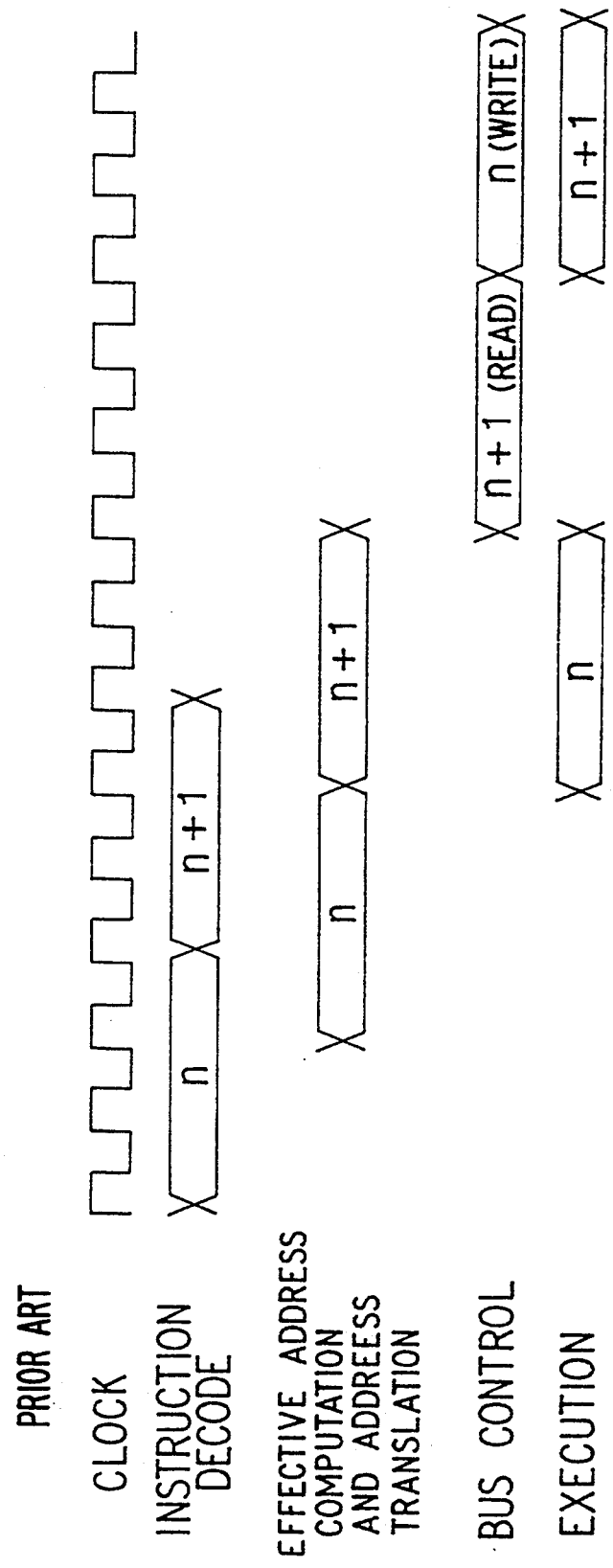
FIG. 1 is a timing chart illustrating the operation of the conventional pipelined CPU.
Figure 2:
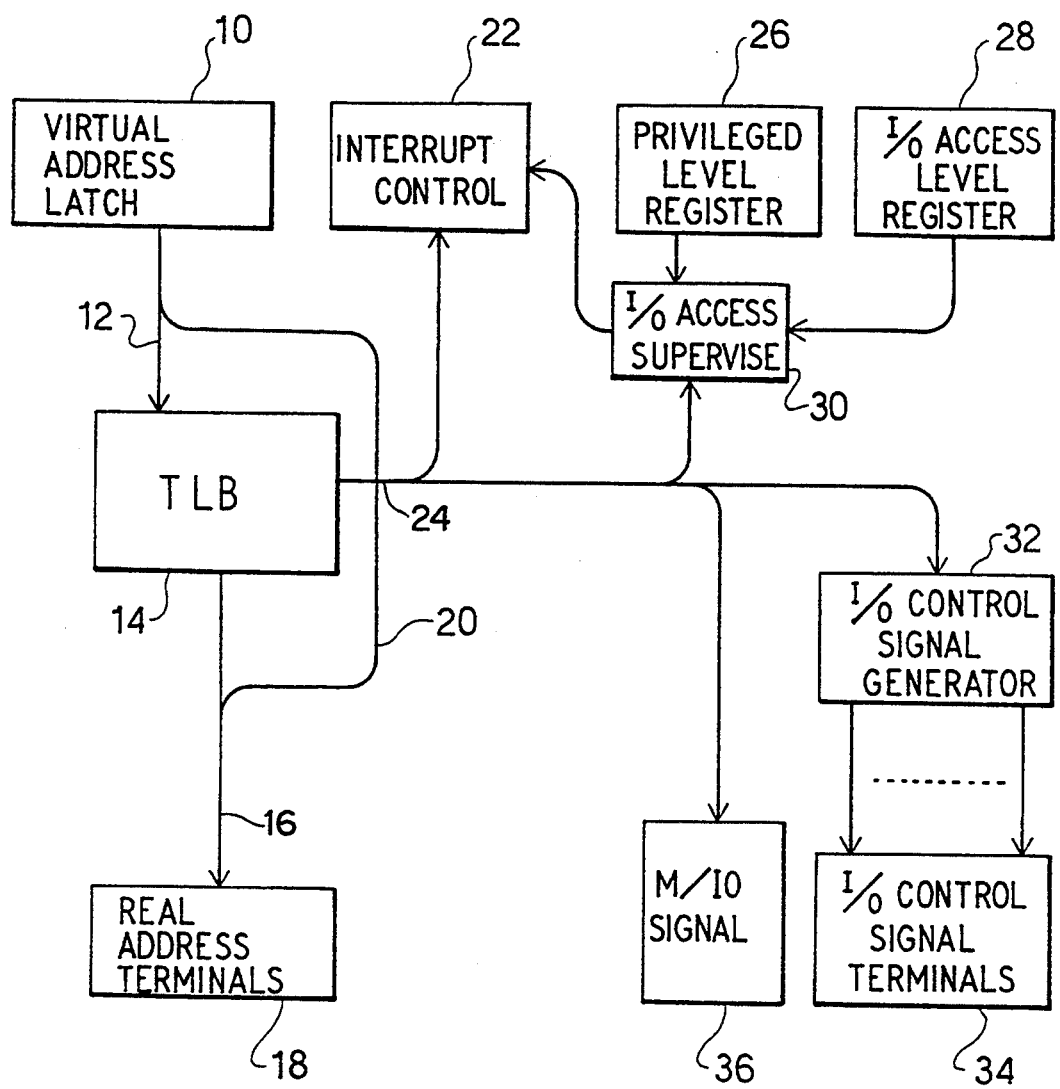
FIG. 2 is a block diagram of one embodiment of the CPU in accordance with the present invention.

Referring to FIG. 2, there is shown a block diagram of a first embodiment of the data processor in accordance with the present invention. The shown data processor comprises a virtual address latch 10 which receives an effective address or virtual address of an operand to be executed from an instruction analyzer or instruction decoder unit (not shown). The virtual address latch 10 is coupled through a bus 12 to a translation lookaside buffer (called "TLB" hereinafter) 14, where more significant data of the virtual address is compared with the address table in the TLB 14. If a real address corresponding to the input virtual address is found, more significant data of the real address is outputted through a bus 16 to a real address terminal 18, which also receives less significant data of the non-translated virtual address from the address latch 10 through a bus 20, so that the more significant data of the real address on the bus 16 and the less significant data of the virtual address on the bus 20 are combined and then outputted from the terminal 18. Further, TLB 14 operates to generate one bit of information which indicates whether the real address is the main memory address or the I/O address. This information is called "M/IO information" hereinafter. The M/IO information is supplied to an interrupt control circuit 22 through a bus 24. This interrupt control circuit 22 has not only the conventional interrupt function but also a new function which controls the interrupt when the access to the I/O device is detected from the M/IO information and when the access to the I/O device is set at levels other than a designated privileged level. For this purpose, there are provided a register 26 indicating the privileged level of the current instruction execution, and another register 28, which is set by a user, for setting the privileged level dedicated for I/O access. The contents of these registers 26 and 28 are inputted to an I/O access supervisor 30 where both the contents are compared with each other. If the contents of the registers 26 and 28 are not consistent, when the M/IO information indicates the I/O access, the supervisor 30 demands the interrupt to the interrupt controller 22.

Figure 6:
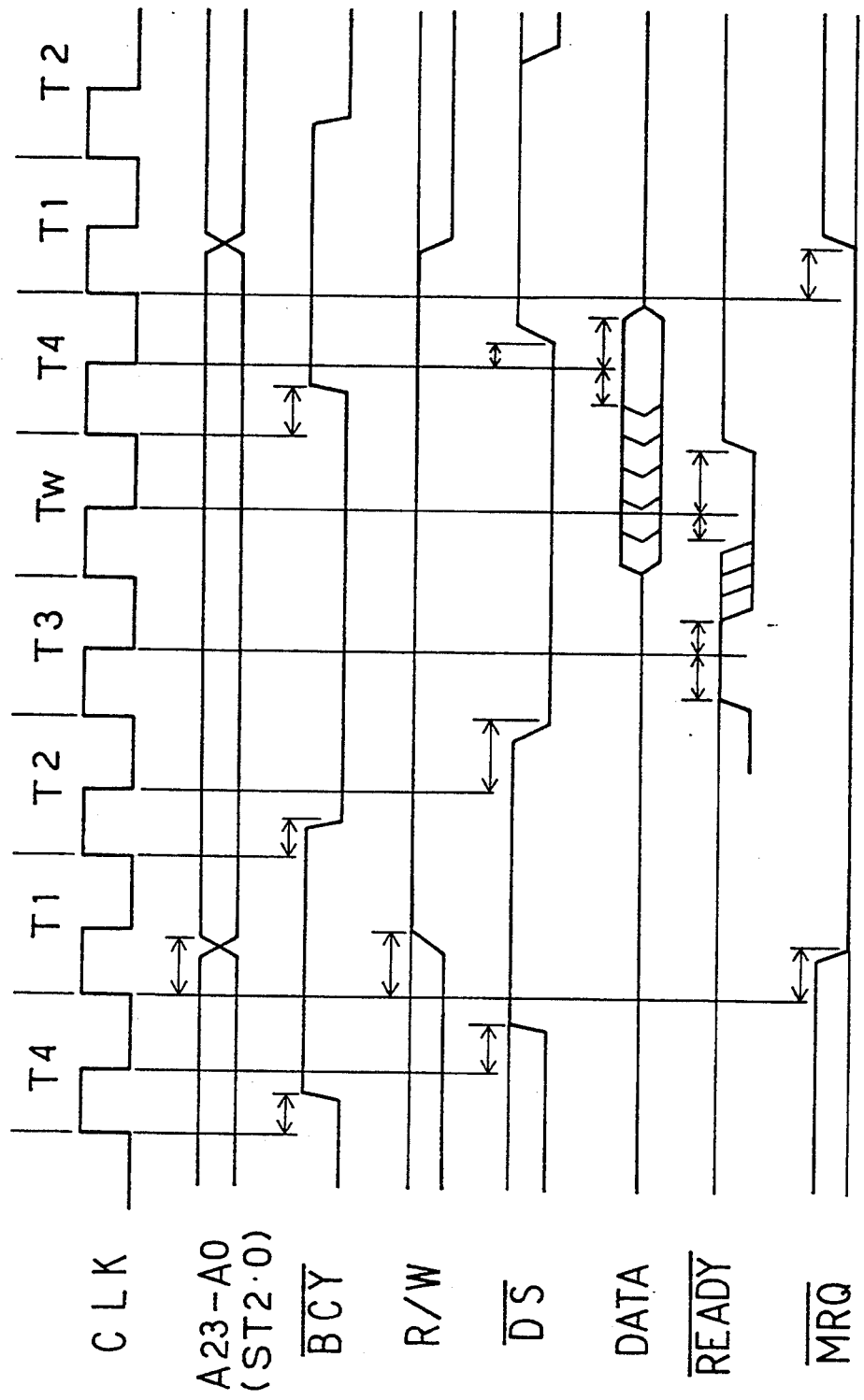
FIGS. 6 and 7 are timing charts illustrating the operations of the CPU shown in FIG. 2.
Figure 7:
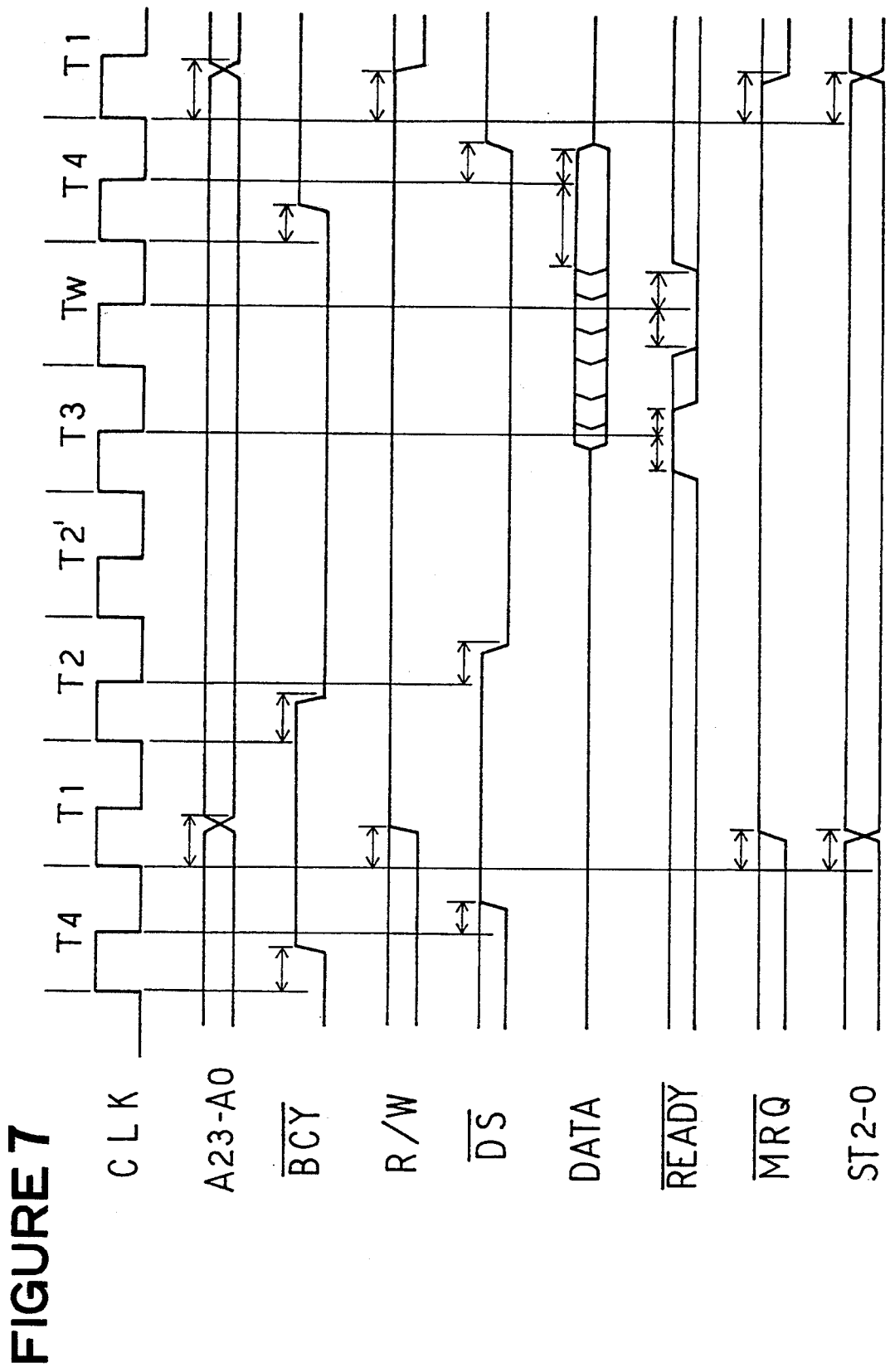

Furthermore, the M/IO information is supplied to an I/O control signal generator 32, which outputs to an external through terminals 34 a group of I/O control signals as shown in FIGS. 6 and 7. In addition, the M/IO information is also supplied to an M/IO signal terminal 36.

Figure 3:
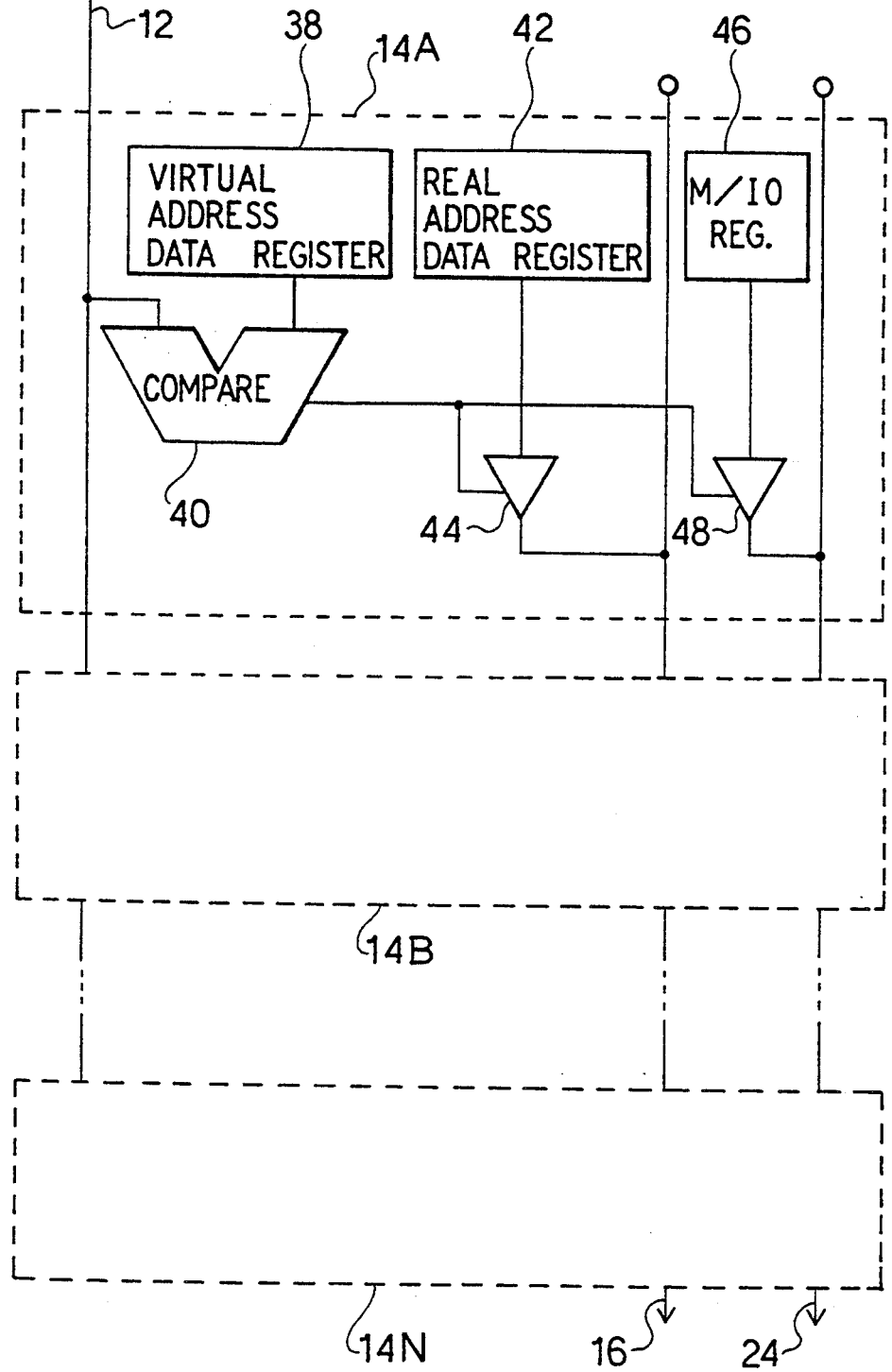
FIG. 3 is a block diagram of an address translation unit (TLB) used in the CPU shown in FIG. 2.

Turning to FIG. 3, there is shown one example of the TLB 14, which includes a plurality of cascade-coupled blocks 14A, 14B . . . 14N having the same structure and each corresponding to one entry or address. As seen from FIG. 3, each block includes one virtual address data register 38 which stores more significant data of one virtual address as one retrieval data. The register 38 is connected to one input of a comparator 40, whose other input is coupled with the bus 12 from the latch 10.

Further, each of the blocks 14A, 14B . . . 14N includes a real address data register 42 which stores more significant data of one real address corresponding to the virtual address stored in the virtual address register 38 of the same block. The output of the register 42 is coupled through a transfer gate 44 to the bus 16 leading to the real address terminals 18. In addition, there is provided an M/IO register 46 adapted to store the M/IO information corresponding to the real address stored in the real address data register 42. The output of this register 46 is coupled through a transfer gate 48 to the bus 24 extending to the interrupt control unit 22, etc. The transfer gates 44 and 48 are controlled by the comparator 40. Namely, when the virtual address on the bus 12 is consistent with the address in the register 38, the associated comparator 40 operates to turn on the gates 44 and 48, so that the real address and the M/IO information are outputted from the registers 42 and 46 to the buses 16 and 24, respectively.

Figure 4:
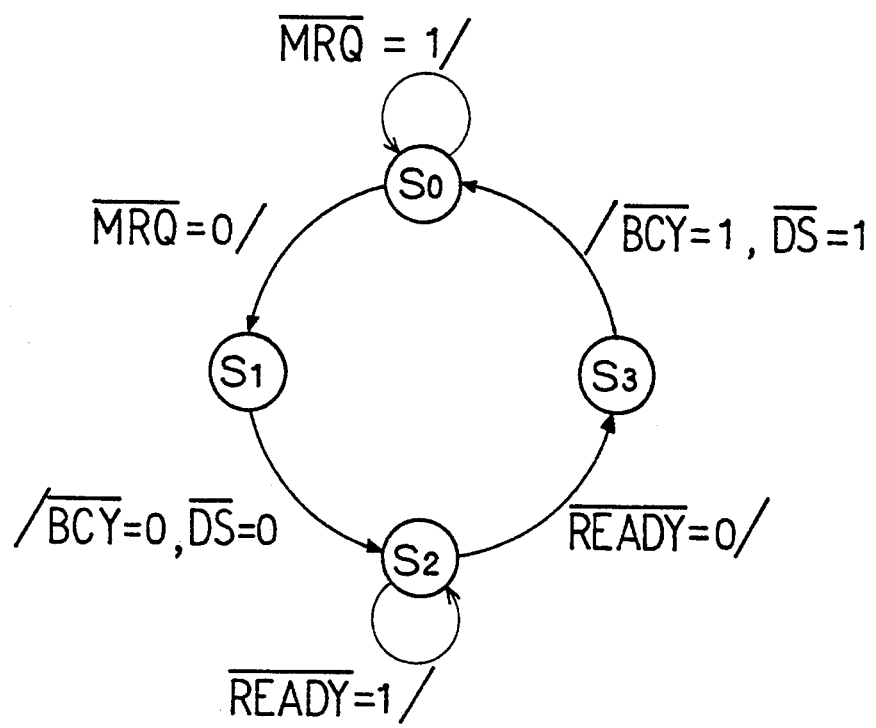
FIGS. 4 and 5 are diagrams illustrating the operations of the CPU shown in FIG. 2.
Figure 5:
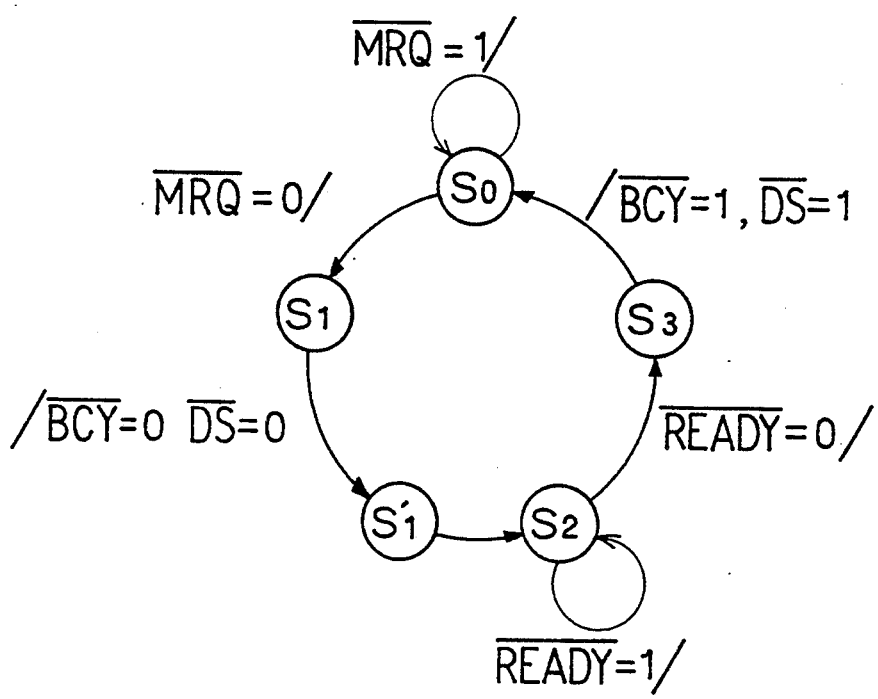

Referring to FIGS. 4 and 5, there are illustrated the operation of the interrupt control unit 22 in the form of automation models. Specifically, FIG. 4 illustrates the status transition in the reading cycle for the main memory, and FIG. 5 shows the status transition in the reading cycle for the I/O device. Further, in these figures, circles indicate the status and arrows indicate the transition, which is caused at every clock cycle. In addition, the equation put at the leftside of each slash mark in these figures represents a required transition condition, and the equation at the rightside of each slash mark shows the change of the output as the result of the transition.

Next, operation of the CPU as mentioned above will be described with reference to FIGS. 4 and 5 and also FIGS. 6 and 7 which illustrate the change of various signals. In FIGS. 6 and 7, CLK shows the clock signal supplied to the CPU, and A23-A0 indicates the address signal for accessing the main memory and the I/O device. $\overline{BCY}$ represents an output signal indicating that the address signal A23-A0 is effective, and R/W is a read/write signal. $\overline{DS}$ shows a signal indicative of the condition that the CPU can receive the data. DATA is a data input signal, and $\overline{READY}$ indicates a read operation complete signal from the main memory or the I/O device. $\overline{MRQ}$ is a signal for distinguishing between the main memory access and the I/O access. ST2-0 shows the type of the reading operation and the halt condition of these signals, $\overline{BCY}$, R/W, $\overline{DS}$, $\overline{READY}$, $\overline{MRQ}$ and ST2-0 are the I/O control signals generated in the generator 32.

When an instruction is executed within the CPU, if there occurs a request of reading or writing an operand or instruction to a virtual address calculated using index information and displacement information, the virtual address is then transferred to the latch 10.

The more significant data of the latched virtual address is transferred through the bus 12 to the TLB 14, and the less significant data of the latched virtual address is transferred through the bus 20 to the address terminals 18. The partial data transferred to the TLB 14 is compared with the value stored in the virtual address register 38 of each entry or block 14A, 14B ... 14N by the comparator 40 of each block. If coincidence is found in one block, the comparator 40 in that block operates to turn on the associated gates 44 and 48. As a result, the contents of the registers 42 and 46 in that block are outputted to the buses 16 and 24. If there exists no block in which the value of the associated virtual address register is consistent with the data on the bus 12, the contents of the three registers 38, 42 and 46 are updated in the entry or block selected in accordance with the virtual memory management system. Thereafter, the data on the bus 12 is compared with the updated value. The updating and comparisons are repeatedly carried out until coincidence is found.

Thus, the more significant data of the real address corresponding to the virtual address latched in the latch 10 is outputted through the bus 16 to the terminals 18, and the M/IO information of that real address is outputted through the bus 24 to the terminal 36 and also to the interrupt control circuit 22, the I/O access supervisor 30 and the I/O control signal generator 32.

If there is a request for stopping execution of the access to the I/O device or an internal interrupt request, the interrupt control circuit 22 operates to interrupt the execution of instruction in response to the M/IO information on the bus 24. The supervisor 30 watches the privileged level of I/O access by comparing the current privileged level stored in the register 26 with the I/O access privileged level set by a user and stored in the register 28. When the contents of both the registers 26 and 28 are consistent, if the I/O access request is generated and at the same time the M/IO information on the bus 24 indicates the I/O access, the supervisor 30 outputs a signal to the interrupt control circuit 22 so as to cause it to carry out the privileged violation interrupt.

Now, assuming that the CPU operates to perform the I/O access for reading data from an external device, if the M/IO information on the bus 24 indicats the main memory access, the I/O control signals are generated in accordance with the automation shown in FIG. 4. When the CPU is in the initial condition $S_0$, the CPU is transited to the status $S_1$ at a first clock $T_1$ (FIG. 6) after $\overline{MRQ}$ signal is brough to the logic level "0". Thereafter, with a second clock $T_2$ the $\overline{BCY}$ signal and $\overline{DS}$ signal are brought into the logic level "0", and the CPU is transited to the status $S_2$. At this time, if $\overline{READY}$ signal is at the logic level "1" as shown by the period of the clock $T_3$ in FIG. 6, the CPU is put in a response waiting condition i.e., is maintained in the status $S_2$. But, if $\overline{READY}$ signal is brought to the logic level "0" as shown by the period of the clock $T_w$ in FIG. 6, the CPU is transited to the status $S_3$ and operates to bring $\overline{BCY}$ signal and $\overline{DS}$ signal to the logic level "1" at the next clock $T_4$. As a result, the CPU is transited to the status $S_0$.

On the other hand, if the M/IO information on the bus 24 indicates the I/O access, the I/O control signals are generated in accordance with the automation shown in FIG. 5. Namely, when the CPU is in the initial condition $S_0$, the CPU is transited to the status $S_1$ at a first clock $T_1$ (FIG. 7) after $\overline{MRQ}$ signal is brought to the logic level "0". Thereafter, with a second clock $T_2$, $\overline{BCY}$ signal and $\overline{DS}$ signal are brought into the logic level "0", and the CPU is transited to the status $S_1'$. This condition is maintained during the succeeding clock $T_2'$ as shown in FIG. 7. Namely, the CPU is transited from the status $S_1'$ to the status $S_2$. Then, with the next clock $T_3$, if $\overline{READY}$ signal is at the logic level "1", the CPU is put in a response waiting condition i.e., is maintained in the status $S_2$. But, if $\overline{READY}$ signal is brought to the logic level "0" as shown by the period of the clock $T_w$ in FIG. 7, the CPU is transited to the status $S_3$ and operates to bring $\overline{BCY}$ signal and $\overline{DS}$ signal to the logical level "1" at the clock $T_4$. Thus, the CPU is returned to the $S_0$.

As is apparent from the above description and as seen from comparison between FIGS. 4 and 5, in the case of I/O access, the status $S_1'$ is put between the status $S_1$ and $S_2$, so that it is possible to read the signal from the I/O device at a sufficiently stable condition.

As seen from the above description, the CPU as mentioned above comprises the internal virtual memory management mechanism, and the memory mapped I/O is constructed in the internal virtual memory space within the CPU.

With this arrangement, since it is possible in the virtual memory management mechanism to distinguish between the main memory access and the I/O access, when the virtual address is translated to the real address, it is possible to generate the M/IO information which indicates whether the real address is directed to the main memory address or to the I/O address.

Further, in the above mentioned embodiment, the M/IO information is included in the TLB used for the virtual memory management. Therefore, by voluntarily setting the value of each row in the M/IO information column of the TLB, a voluntary partial space of the virtual memory space can be allocated to I/O devices, and the remaining partial space can be allocated.

In addition, since the M/IO information is generated within the CPU, the M/IO information can be internally utilized in the CPU. Namely, the CPU can carry out internal processing for stopping the execution of instruction in the course of the I/O access and generating an internal interrupt. The CPU can also permit a user to set the privileged level dedicated for the I/O access. In addition, the CPU can generate special timing and I/O control signals for I/O access.

As mentioned above, since the I/O space can be allocated to a voluntary partial space, the main memory reference method for instructions executed in the CPU can be used for the I/O space. In addition, by the internal interrupt and stop of instruction execution in the course of the I/O access, it is possible to effectively carry out the program development and debugging. Further, since a user can set the privileged level dedicated for the I/O access, it is possible to manage external I/O devices at any level between the highest level for the operating system and the user's level. Additionally, since the CPU generates the I/O control signals, the peripheral circuits of the CPU can be simplified.

In the above embodiment, the M/IO information is used for the I/O access trap function, the I/O privileged level designation function, and the generation of the I/O control signals for the I/O access. But, the protection method for the virtual memory management can be modified on the basis of the M/IO information.

In addition, in the above embodiment, the status of $\overline{DS}$ signal is inverted between the status $S_1$ and $S_1'$. But, since the I/O device needs a longer time for address decoding in comparison with the main memory, the status inversion of $\overline{DS}$ signal can be carried out between the status $S_1$ and $S_2$ so that selection of I/O device can be made with a sufficient time.

Figure 8:
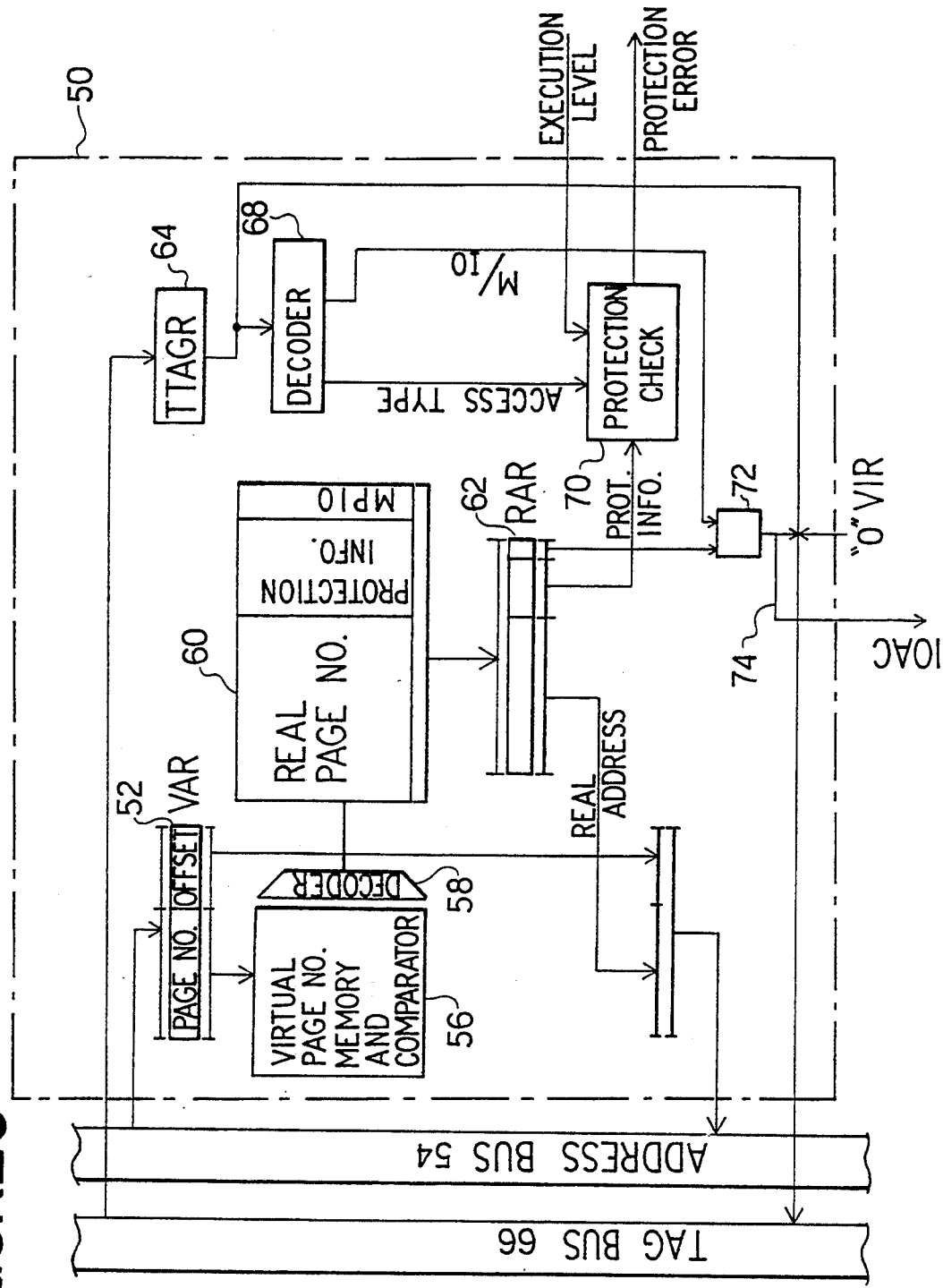
FIG. 8 is a block diagram of another embodiment of the address translation unit (TLB)

Referring to FIG. 8, there is shown a block diagram of an address translation unit which can incorporated in one embodiment of the CPU in accordance with the present invention. The shown address translation unit is in the form of so-called translation lookaside buffer (TLB) generally indicated by Reference Numeral 50. The TLB 50 includes a temporary register 52 for temporarily holding an effective address or virtual address fed through an address bus 54 from an effective address computation unit (not shown in FIG. 8). The register 52 is called "VAR" hereinafter. The effective address held in the VAR 52 includes at least page number information and offset information. The page number of the effective address in the VAR 52 is fed to a virtual address memory 56 which stores a plurality of virtual address page numbers. This memory 56 has a comparison function for comparing the virtual page number portion stored in the VAR 52 with respective virtual address page numbers stored in the memory 56 itself. Further, memory 56 is associated with a decoder 58 which detects the entry of the virtual address page number consistent with that of the VAR 52 and then outputs the entry number of the consistence entry to a data memory 60. This memory 60 stores a plurality of read address information sets, each including at least a real address page number, associated protection information and MPIO Information indicating whether or not that real address is allocated to an I/O device.

The real address memory 60 can be compared to an address translation table 310 as shown in FIG. 9A, which is ordinarily formed in a main memory and includes a number of page descriptors 320 each constituting one entry. Each of the page descriptors 320 includes 32 bits as shown in FIG. 9B. The least significant bit, i.e., the first bit 321, indicates whether or not the content of the descriptor is effective. This first bit is called "V bit" hereinafter. The second bit 322 gives the MPIO Information showing whether or not the page designated by the descriptor is mapped to an I/O space. The third bit 323 indicates whether or not the page designated by the descriptor exists in the main memory. This third bit is called "P bit" herein. Further, the descriptor includes a bit 324 indicating whether or not the page designated by the descriptor has been referred to by the CPU. This bit will be called the "A bit". The descriptor also includes a bit 325 indicative of whether or not the page designated by the descriptor has been written by the CPU, and this bit is called "W bit". In addition, three bits 326 gives the protection information for the page designated by the descriptor. Twenty bits 327 of the descriptor 320 gives a real address of the memory space or the I/O space to which the page indicated by the descriptor is mapped.

The real address memory 60 having the above mentioned page table is adapted to output the real address information set, i.e., the page descriptor of the entry designated by the decoder 58, to a temporary register 62 which is called "RAR" hereinafter. Therefore, the real address page number, the protection information, the MPIO Information, etc. are stored in the RAR 62, and the real address page number stored in the RAR 62 is combined with the offset information stored in the VAR 52, so that the combined real address and offset information are fed through the address bus 54 to a main memory control unit not shown in FIG. 8.

Furthermore, the TLB 50 comprises a temporary register 64 coupled to a tag bus 66 so as to store tag information fed from the effective address computation unit simultaneously with the virtual address to the VAR 52. This register 64 is called "TTAGR" hereinafter. This TTAGR 64 is coupled to a decoder 68 which operates to decode the tag information stored in the TTAGR 64 and to a generate an access type signal and a M/IO signal which indicates whether the access is a memory access or an I/O access. The access type signal is inputted to a protection check circuit 70, which also receives execution level information from an instruction execution unit (not shown in FIG. 8) and the protection information from the RAR 62. On the basis of this information the check circuit 70 detects the protection exception to generate a protection error signal. On the other hand, the M/IO signal is fed to an I/O access discrimination circuit 72, which also receives the M/IO signal from the decoder 68, so as to determine whether the virtual address fed from the effective address computation unit indicates the memory space or the I/O space. When it indicates the I/O space, the circuit 72 generates an I/O access signal (called "IOAC" hereinafter) through a signal line 74 to the effective address computation unit. Further, the I/O access signal IOAC and the information stored in the TTAGR 64 are outputted through the tag bus 66, concurrently with the real address outputted to the address bus 54.

Figure 10:
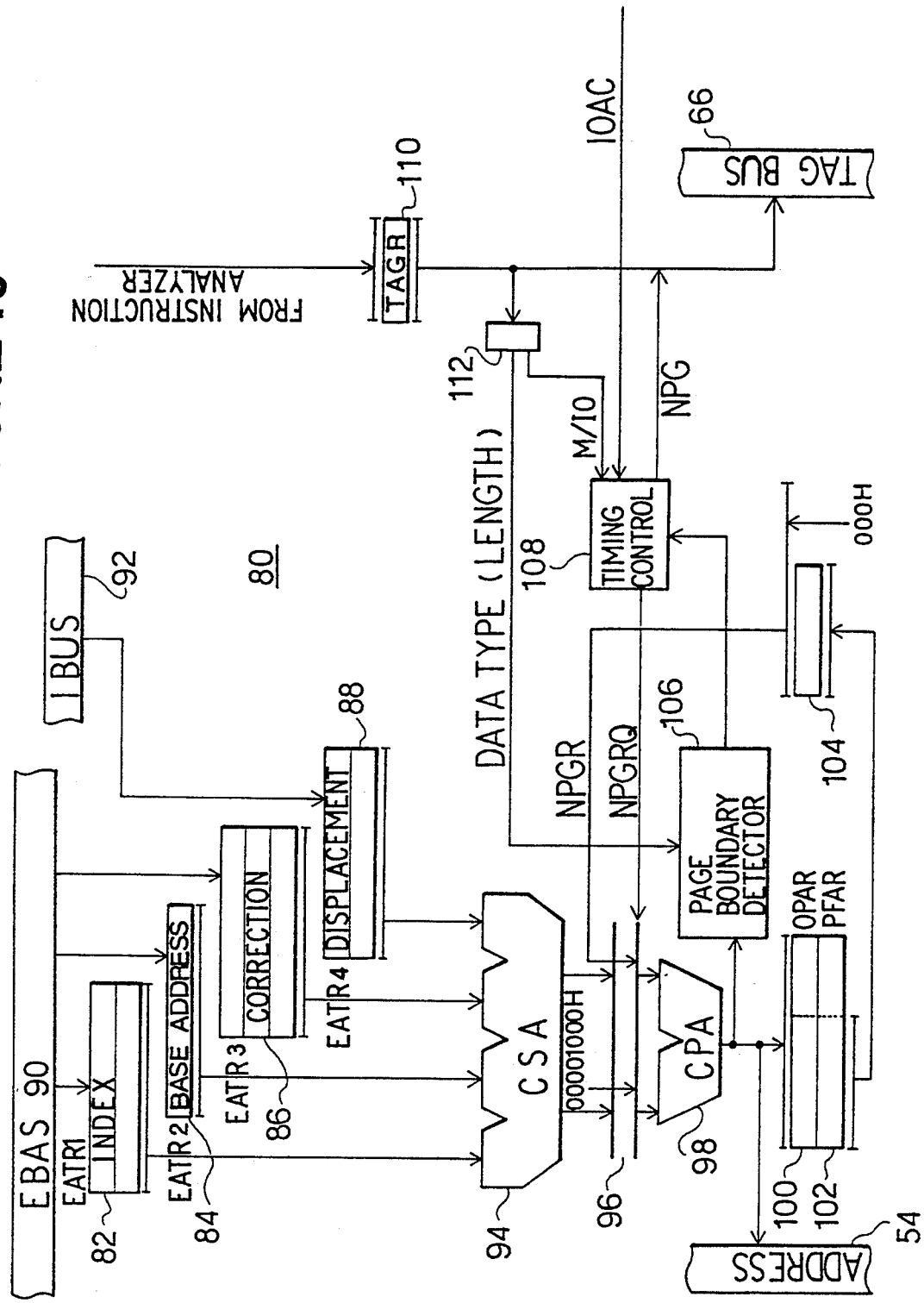
FIG. 10 is a block diagram of an effective address computation unit.

Turning to FIG. 10, there is shown a block diagram of an effective address computation unit which can be used in combination with the TBL 50 shown in FIG. 8. The shown effective address computation unit is generally shown by reference numeral 80, and comprises four temporary registers 82, 84, 86, and 88. The first three registers 82, 84, and 86 are coupled to a bus 90 through which the values in the general purpose register required for effective address computation are fed from the instruction execution unit (not shown in FIG. 10). The register 82 temporarily stores the index value, and the register 84 temporarily stores the base address. The register 86 stores correction values such as predecrement, postincrement, etc. The last register 88 is coupled to another bus 92 so as to receive the displacement value from an instruction analyzing unit (not shown in FIG. 10). The bus 92 is called "IBUS" hereinafter, and the four registers 82–88 are called "EATR 1", "EATR 2", "EATR 3" and "EATR 4", respectively hereinafter.

EATR 1, EATR 2, EATR 3 and EATR 4 are connected to a carry save adder 94, called "CSA" hereinafter. This CSA has a sum output and a carry output connected to a multiplexor 96, respectively, which also receives a constant "1000H" and a NPGR value explained hereinafter. The multiplexor 96 operates to select either the sum and carry outputs of the CSA 94 or the constant "1000H" and the NPGR value in accordance with an NPGRQ signal also explained hereinafter, and then outputs the selected information to two inputs of a carry propagate adder 98, called "CPA" hereinafter.

The CPA 98 outputs an effective address, which is coupled to the address bus 54 so that the computed effective address is fed to the TLB 50 and the main memory control unit. Further, the effective address output of the CPA 98 is connected to a register 100 for storing the effective address of a memory operand in the computed effective address, and also to another register 102 for storing the effective address of a branch or prefetch target in the computed effective address. These registers 100 and 102 are called "OPAR" and "PFAR", respectively hereinafter. A virtual page number portion of the PFAR 102 (the address data obtained by removing the page offset from the effective or virtual address) is coupled to a register 104, which is used to store the virtual page number of the previous page. The content of the register 104 is combined with a constant "000H" to be outputted to the multiplexor 96 as the NPGR value.

In addition, the effective address output of the CPA 98 is connected to a page boundary detecting circuit 106, which also receives operand type information so as to detect whether or not the operand extends over a page boundary. The output of this detecting circuit 106 is connected to a timing control circuit 108, which operates to generate the NPGRQ signal when the operand extends over the page boundary, so that the multiplexor 96 selects the NPGR value.

The effective address computation unit 80 also includes a register 110 for storing tag information of an operand address fed from the instruction analyzer. This register 110 is called "TAGR" hereinafter, and is connected to a circuit 112 adapted to decode the tag information and to generate the operand data type signal "DATA TYPE" to the page boundary detector 106. Further, the circuit 112 generates an M/IO signal indicative of whether or not the instruction is the I/O access instruction. This M/IO signal is inputted to the timing control circuit 108 together with the IOAC signal from the TLB 50. The tag information stored in the TAGR 110 and a NPG signal generated in the timing control circuit 108 are supplied through the tag bus 66 to the TLB 50 and the main memory control unit.

Figure 11:
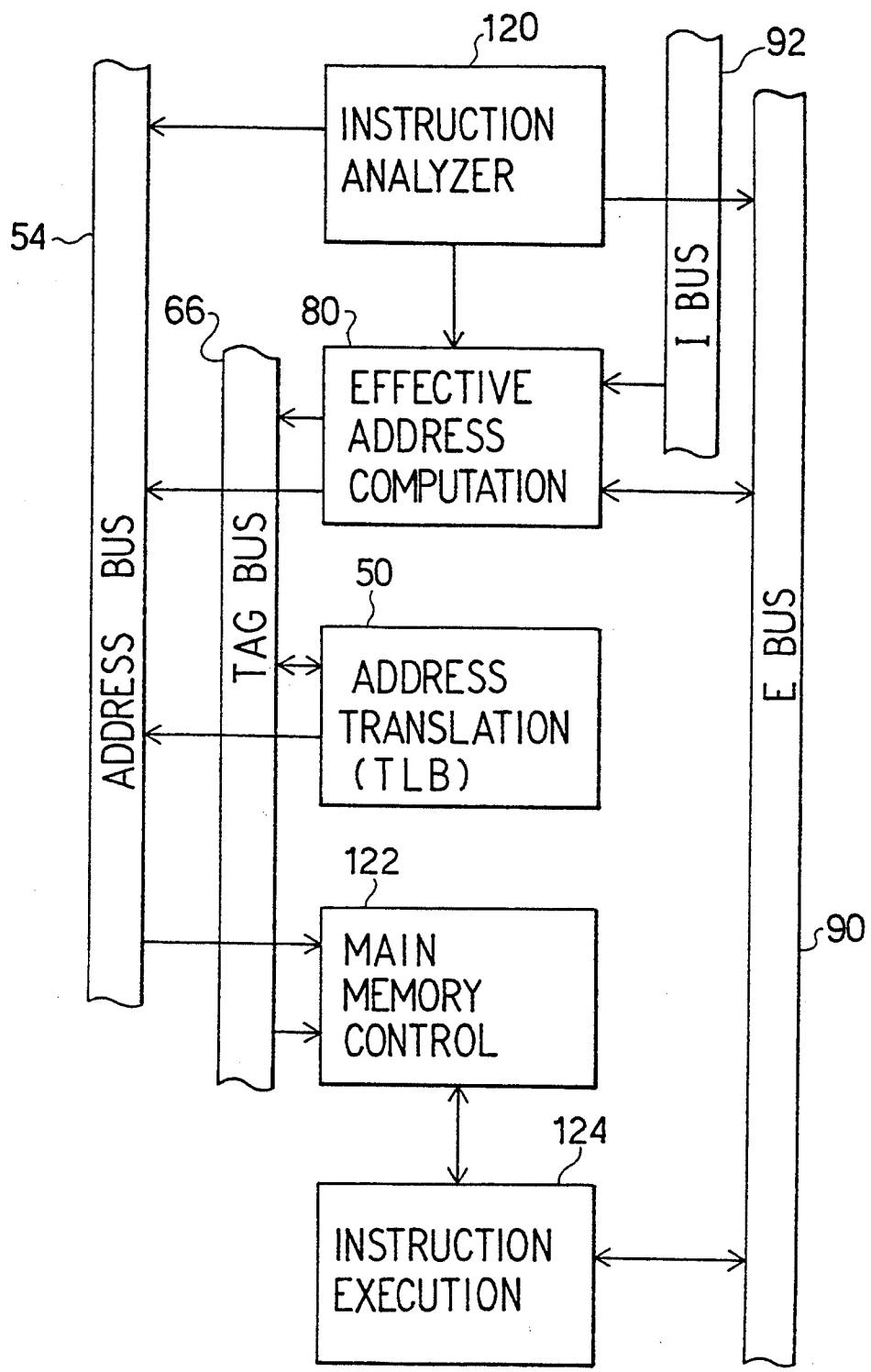
FIG. 11 is a block diagram of another embodiment of the CPU in accordance with the present invention.

Referring to FIG. 11, there is shown a block diagram of a second embodiment of the CPU in accordance with the present invention, which can incorporate the TLB 50 shown in FIG. 8 and the effective address computation unit 80 shown in FIG. 10. The shown CPU comprises an instruction analyzing or decoding unit 120, the effective address computation unit 80, the address translation unit or TLB 50, a main memory control unit 122 and an instruction execution unit 124, which are coupled to one another as shown in FIG. 11 through the address bus 54, the tag bus 66, E bus 90 and I bus 92.

In brief, the instruction analyzing unit 120 operates to receive an instruction read out of a main memory (not shown) and to decode the instruction into the form which can be directly executed in the instruction execution unit 124. Then, the analyzing unit 120 outputs the decoded instruction to the instruction execution unit 124 through the E bus 90. Further, if an instruction analyzed in the instruction analyzer 120 includes an operand directed to a memory space or an I/O space, the instruction analyzer 120 supplies the effective address computation unit 80 with the information required for the effective address computation of the same operand (such as index value, base value, displacement value, etc.).

On the basis of the information from the instruction analyzer 120, the effective address computation unit 80 computes an effective address and associated tag information and outputs them through the address bus 54 and the tag bus 66 to the TLB 50.

This TLB 50 converts the effective address to a real address, which is fed together with the associated tag information to the main memory control unit 122 through the address bus 54 and the tag bus 66.

Thus, in accordance with the real address from the TLB 50, the main memory control unit 122 operates to access a main memory (not shown) or an I/O device (not shown). In the case of reading an operand, the memory control unit 122 operates to supply the main information read from the main memory or the I/O device to the instruction execution unit 124. On the other hand, in the case of writing, the control unit 122 operates to write the information sent from the instruction execution unit 124, into the main memory or the I/O device. The instruction execution unit 124 is adapted to execute a given instruction in accordance with the decoded information of the given instruction supplied from the instruction analyzer 120.

Figure 12:
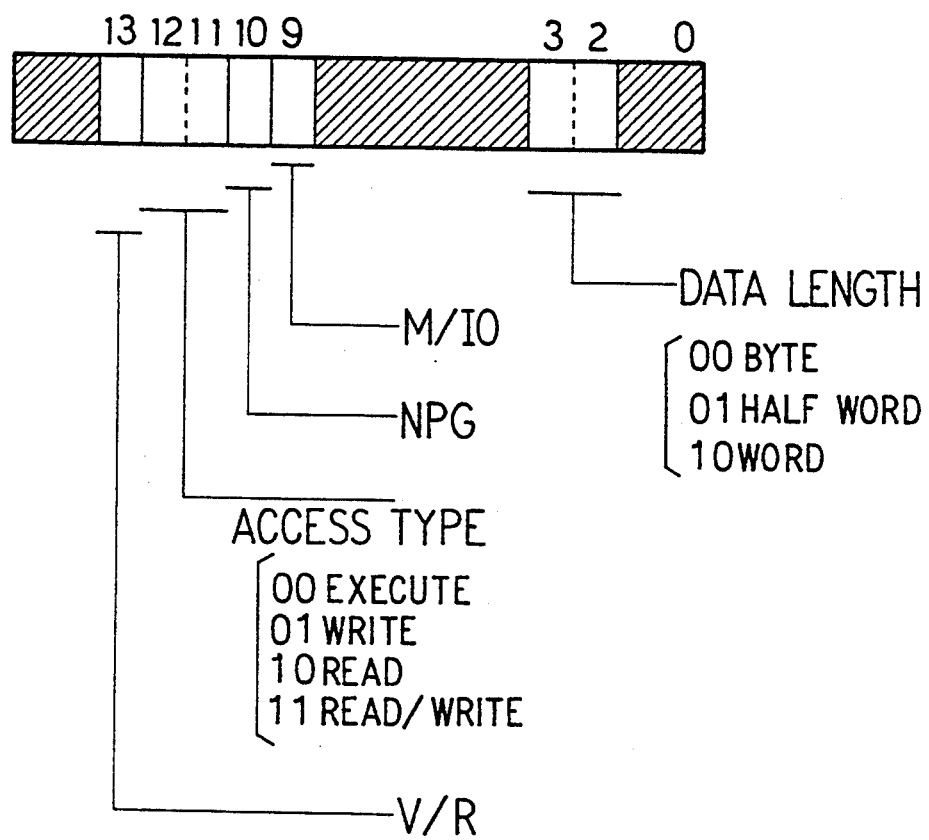
FIG. 12 illustrates one example of the tag information.

The address bus 54 and the tag bus 66 are used in pair. Namely, when the effective address is transferred on the address bus 54, the tag information associated with the effective address concurrently on the address bus 54 is transferred through the tag bus 66. When the real address is on the address bus 54, the tag information associated with the real address concurrently on the address bus 54 is transferred through the tag bus 66. For example, the tag information transferred on the tag bus 66 includes several items of data as shown in FIG. 12. Namely, (1) Bits 2–3 shows the operand data length:
00: bite (1 byte)
01: half word (2 bytes)
10: word (4 bytes)

(2) Bit 9 shows M/IO signal L:
1: access to memory space
0: access to I/O space (3) Bit 10 is NPG signal. "1" means that the address is the head address of the next page when the operand extends over the page boundary.
"0" means that the address is an operand address.

(4) Bits 11–12 indicate the access type:
00 . . . Execute
01 . . . Write
10 . . . Read
11 . . . Read/Write (5) Bit 13 shows V/R information. "1" means that the address is an effective address (virtual address).

"0" means that the address is a real address.

Now, explanation will be made on operation of the above mentioned CPU when it executes an instruction having an operand for involving a memory or I/O space access.

When the instruction analyzer 120 has analyzed a given instruction, it supplies the information required for an effective address computation (the values of the general purpose register such as the index value, the displacement value, etc.) through the E bus 90 and the I bus 92 to the registers EATR 1, EATR 2, EATR 3 and EATR 4. The tag information of the operand (such as the access type, data length, M/IO signal) is fed to the TAGR 110.

Thus, in the effective address computation unit 80, an effective address is computed by cooperation of the carry save adder CSA 94 and the carry propagate adder CPA 98 on the data stored in the EATR 1, EATR 2, EATR 3 and EATR 4. The effective address is stored in the register OPAR 100. On the other hand, the tag information in the TAGR 110 is decoded by the circuit 112 to obtain the data length, and then, whether or not the operand extends over the page boundary is detected by the page boundary detector 106 on the basis of the computed effective address and the data length.

MEMORY SPACE ACCESS

If the M/IO information is "1" indicating the memory space access, and if the IOAC signal from the TLB 50 is "0" indicating that it is not the memory mapped I/O, the effective address for the memory operand stored in the OPAR 100 is outputted through the address bus 54 to the TLB 50. At the same time, the tag information in the TAGR 110 is outputted through the tag bus 66 to the TLB 50.

Next, computation is carried out to obtain the head address of the succeeding page of an operand extending over the page boundary. In this computation, the virtual page number stored in the OPAR 100 (Bits 12-31 of OPAR) is temporarily stored in the register 104, so as to produce the combined data of the virtual page number and the less significant bits 0-11 of all "0". This combined data and the constant "00001000H" are inputted to the adder CPA 98 in response to the NPGR signal from the timing control circuit 108. In this embodiment, since it is assumed that the page size is 4 K bytes, the constant "1000H" is added to obtain the head address of the next page. The result of the sum obtained from the output of the adder CPA 98 is outputted as the head address of the succeeding page through the address bus 54 to the TLB 50. At the same time, the tag information in the TAGR 110 is outputted through the tag bus 66 to the TLB 50. In this case, the bit 9 (NPG) of the tag information is brought into "1".

MEMORY MAPPED I/O

If the M/IO information is "1" indicating the memory space access, and if the IOAC signal from the TLB 50 is "1" indicating that it is the memory mapped I/O, the effective address for the memory operand stored in the OPAR 100 is outputted through the address bus 54 to the TLB 50. At the same time, the tag information in the TAGR 110 is outputted through the tag bus 66 to the TLB 50. At this time, the tag information M/IO is brought to "0". With this, the memory space access is changed to the I/O space access.

I/O ACCESS

When the tag information M/IO in the TAGR 110 is "0", the effective address for the I/O operand stored in the OPAR 100 is outputted through the address bus 54 to the TLB 50. At the same time, the tag information in the TAGR 110 is outputted through the tag bus 66 to the TLB 50.

As mentioned above, the TLB 50 includes the virtual address memory and comparator 56 storing a plurality of virtual page numbers, and the data memory 60 storing a plurality of sets of real page numbers, protection information and MPIO information. In data processors adopting the virtual memory system, a page table including a plurality of page descriptors as shown in FIGS. 9A and 9B is constituted on the main memory. The page descriptors have the real address 327, the protection information 326, etc. In addition, in order to speed up the translation of the virtual address to the corresponding real address, the TLB incorporates therein a copy of the required information contained in the segment descriptor or the page descriptor. In this embodiment, as mentioned above, the page descriptor contains the MPIO information, and if the MPIO information is "1", it is indicated that the page indicated by the page descriptor is mapped to the I/O space. On the contrary, if the MPIO information is "0", it is shown that the page is mapped to the memory space. In addition, this MPIO information is stored in the TLB 50.

The effective address (virtual address) fed from the effective address computation unit 80 is stored in the register VAR 52 of the TLB 50, and the simultaneously supplied tag information is stored in the register TTAGR 64. The virtual page number portion stored in the VAR 52 (bits 12-31 of VAR) is compared with each of the virtual page numbers stored in the virtual address memory 56. If the page number consistent with that of the VAR 52 is found, the entry of the data memory 60 corresponding to the coincidence page number is read out to the register RAR 62.

As mentioned above, each entry in the data memory 60 includes the real page number, the protection information and the MPIO information. The real page number stored in the RAR 62 (bits 12-31 of RAR) is combined with the page offset of the virtual address stored in the VAR 52 (bits 0-11 of VAR), so that the real address is formed and then supplied through the address bus 54 to the main memory control unit 122.

On the other hand, the protection information in the RAR 62 (bits 2-11 of RAR) is supplied to the protection check circuit 70. This circuit 70 also receives the access type information from the decoder 68 and the execution level information from the instruction execution unit 124. Thus, the circuit 70 detects whether or not the access is proper. If the protection exception is detected, the circuit 70 supplies the protection error signal to the instruction execution unit 124.

MPIO information in the RAR 62 (bit 0 of RAR) is fed to the I/O access discrimination circuit 72. When the MPIO information is "1", the circuit 72 changes the M/IO information from the TTAGR 64 to "0" which indicates the I/O space, so that the M/IO information of "0" is fed to the main memory control unit 122. Further, when the MPIO information is "1", the circuit 72 supplies the IOAC signal of "1" to the effective address computation unit 80, thereby to notify that the mode is the memory mapped I/O.

The information stored in the TTAGR 64 is supplied through the tag bus 66 to the main memory control unit 122, simultaneously with application of the real address to the main memory control unit 122. At this time, in the case of memory mapped I/O, the M/IO information is changed to "0" indicating the I/O space access. In addition, the V/R information (indicating whether the data on the address bus is the virtual address or the real address) is brought into "0" indicative of the real address. This V/R information is supplied through the tag bus 66 to the main memory control unit 122.

On the basis of the real address and the tag information thus supplied, the main memory control unit 122 operates to access the memory space or the I/O space. If the M/IO information is "0" indicative of the I/O access, the memory control unit 122 accesses the I/O space by outputting the real address as the I/O port address. But, if the M/IO information is "1" indicating the memory space access, the memory control unit 122 accesses the memory space by outputting the real address as the main memory address.

In the second embodiment as mentioned above, since the memory mapped I/O information is contained in each page descriptor, and is also stored in the TLB, it is possible to detect the memory mapped I/O in the CPU. Therefore, the main memory control unit can access an I/O device by changing the memory operand access mapped in the I/O space to the I/O access. Thus, the memory access and the I/O access are separated from each other in the CPU, and therefore, even if the interleaving method is adopted in the main memory, the I/O devices are comparable to such a main memory.

Further, the effective address computation unit is adapted to receive the memory mapped I/O information from the TLB. Therefore, in a CPU of the paging type virtual memory system in which the operand address is designated by units of a byte, even if the operand extends over a plurality of pages, the CPU can stably operate in the same manner irrespectively of whether the address space is in the memory mapped I/O space or in the memory space.

Figure 13:
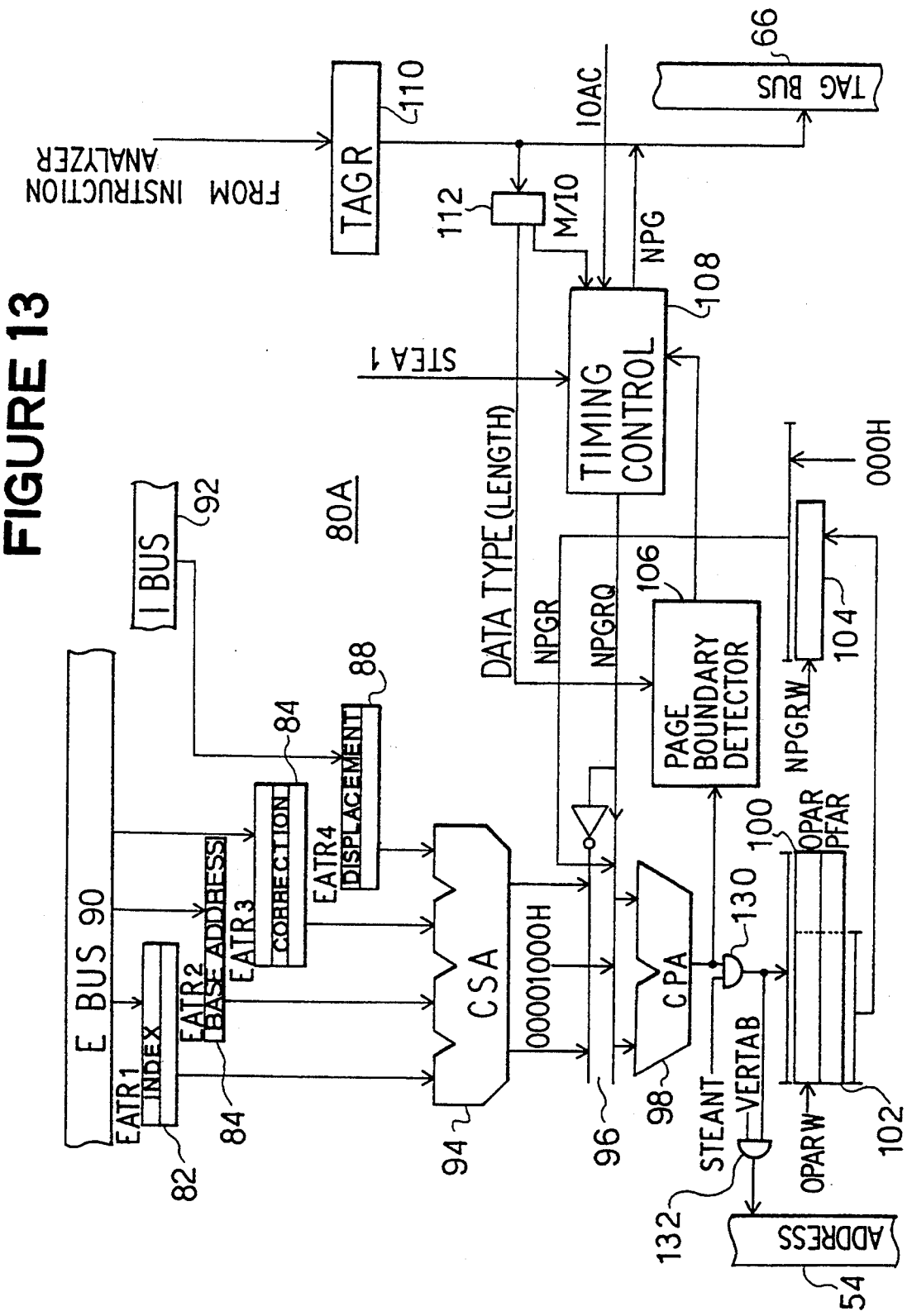
FIG. 13 is a block diagram of another embodiment of the effective address computation unit.

Referring to FIG. 13, there is shown a block diagram of a modified effective address computation unit 80A. In FIG. 13, elements similar to those shown in FIG. 10 are given the same reference numerals, and explanation will be omitted. As seen from comparison between FIGS. 10 and 13, the modified embodiment of FIG. 13 includes an AND gate 130 connected between the CPA 98 and the OPAR 100, and the AND gate 130 receives at its second input a STEANT signal explained hereinafter. Further, the output of the AND gate 130 is connected through another AND gate 132 to the address bus 54. This second AND gate 132 receives at its second input a VERTAB signal explained hereinafter. In addition, the OPAR 100, the register 104 and the timing control circuit 108 receive an OPARW signal, an NPGRW signal and an STEA 1 signal, respectively, which will also be explained hereinafter.

Figure 14:
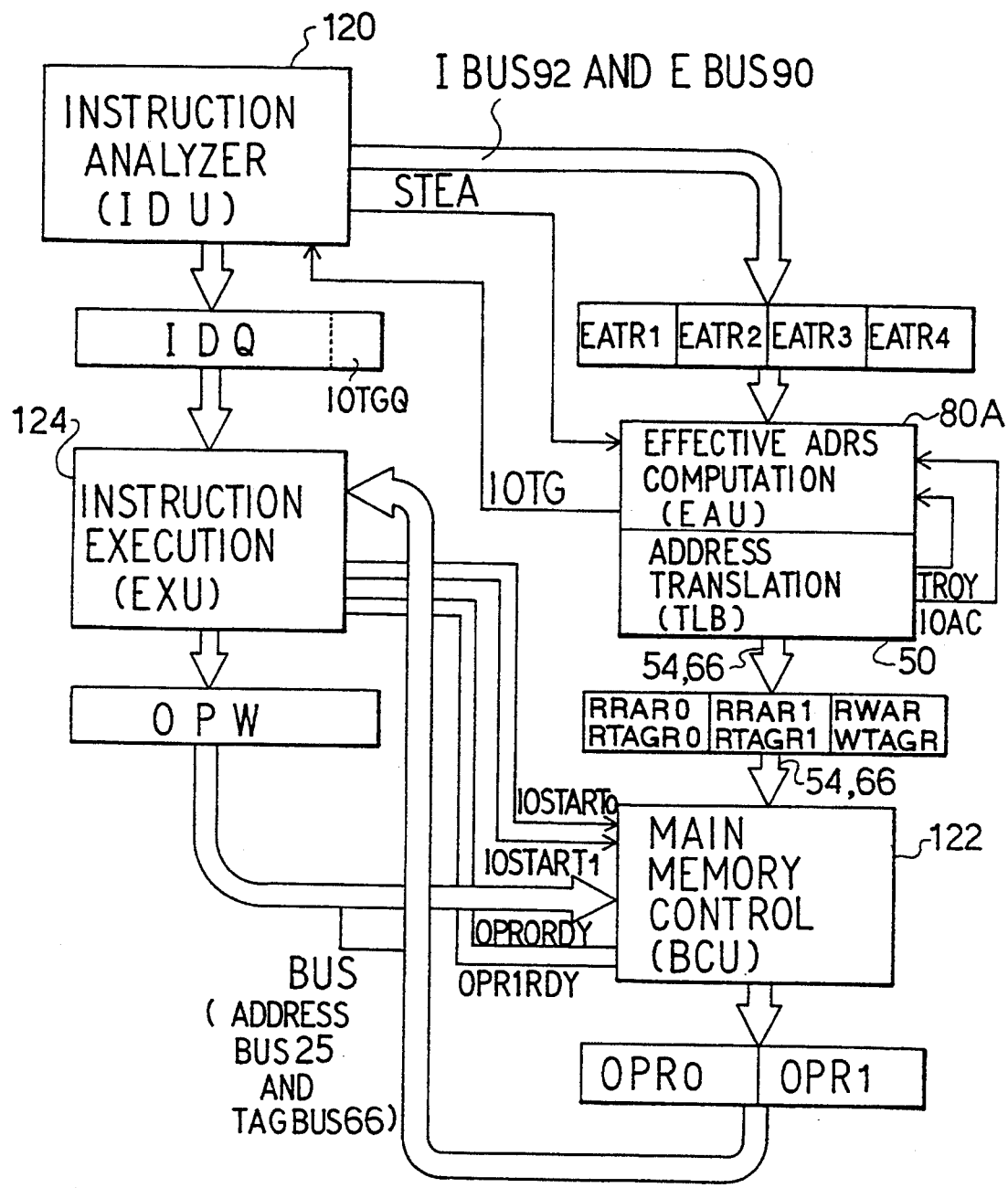
FIG. 14 is a block diagram of a third embodiment of the CPU in accordance with the present invention.

Turning to FIG. 14, there is shown a block diagram of an embodiment of the pipelined CPU which includes the TLB 50 shown in FIG. 8 and the effective address computation unit 80A shown in FIG. 13. In FIG. 14, elements similar to those shown in FIG. 11 are given the same reference numerals.

In brief, the instruction analyzing unit 120 operates to receive an instruction read out of a main memory (not shown) and to decode the instruction into the form which can be directly executed in the instruction execution unit 124. Then, the analyzing unit 120 outputs the decoded instruction to the instruction execution unit 124 through the E bus 90. Further, if an instruction analyzed in the instruction analyzer 120 includes an operand directed to a memory space or an I/O space, the instruction analyzer 120 supplies the effective address computation unit 80A with the information required for the effective address computation of the same operand (such as index value, base value, displacement value, etc.).

Figure 15:
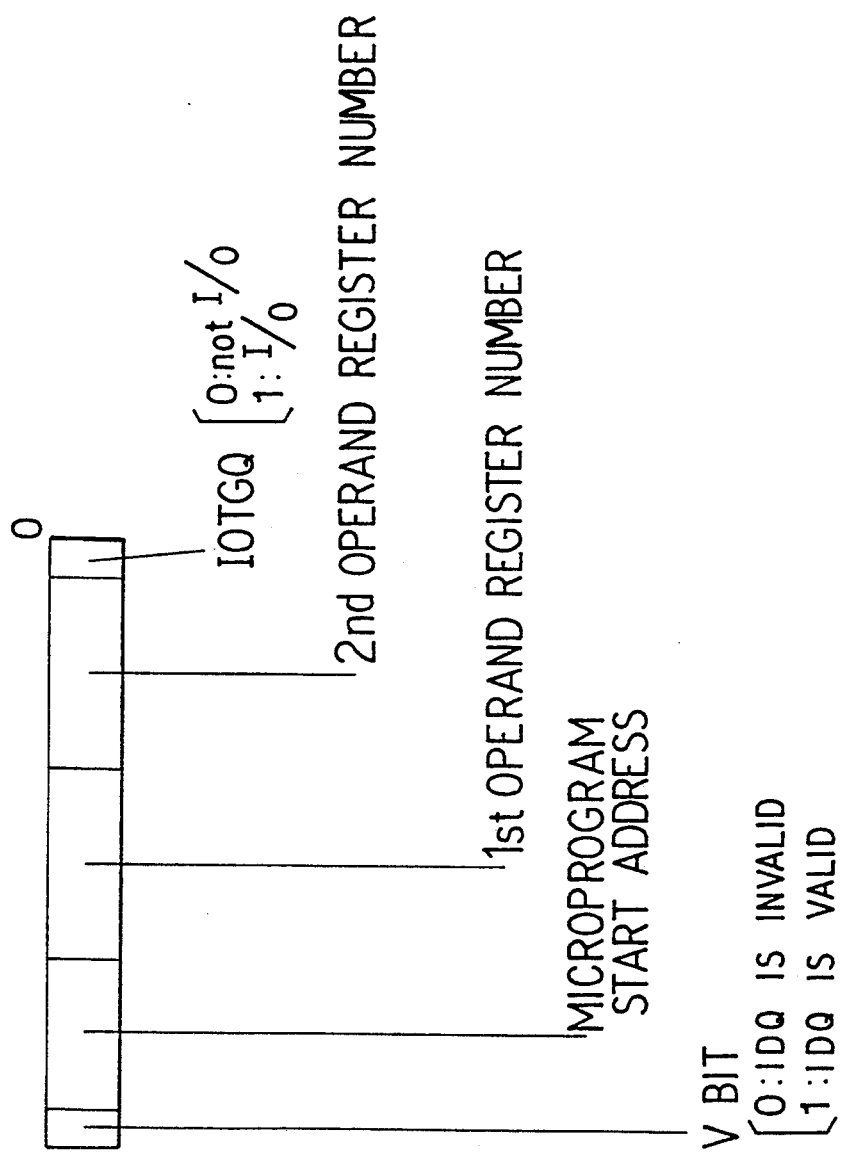
FIG. 15 illustrates one example of the decoded information supplied from the instruction analyzer.

The decoded information outputted from the instruction analyzer 120 is temporarily stored in a register IDQ and then supplied to the execution unit 124. The decoded information includes, as shown in FIG. 15, a microprogram start address, a first operand register number, a second operand register number, IOTGQ information indicative of whether or not the instruction requires the I/O access, and a V bit representative of whether or not the content of the IDQ is valid.

On the basis of the information from the instruction analyzer 120, the effective address computation unit 80A computes an effective address and associated tag information and outputs these through the address bus 54 and the tag bus 66 to the TLB 50.

The TLB 50 converts the effective address to a real address, which is fed together with the associated tag information to the main memory control unit 122 through the address bus 54 and the tag bus 66.

Thus, in accordance with the real address from the TLB 50, the main memory control unit 122 operates to access a main memory (not shown) or an I/O device (not shown). In the case of reading an operand, the memory control unit 122 operates to temporarily store in registers OPR0 and OPR1 the information read from the main memory or the I/O device, and then outputs the information from the registers OPR0 and OPR1 to the instruction execution unit 124. On the other hand, in the case of writing, the information fed from the instruction execution unit 124 is temporarily stored in the register OPW and then written by the memory control unit 122 to the main memory or the I/O device. The instruction execution unit 124 is adpated to execute a given instruction in accordance with the decoded information IDQ of the given instruction supplied from the instruction analyzer 120.

Figure 16:
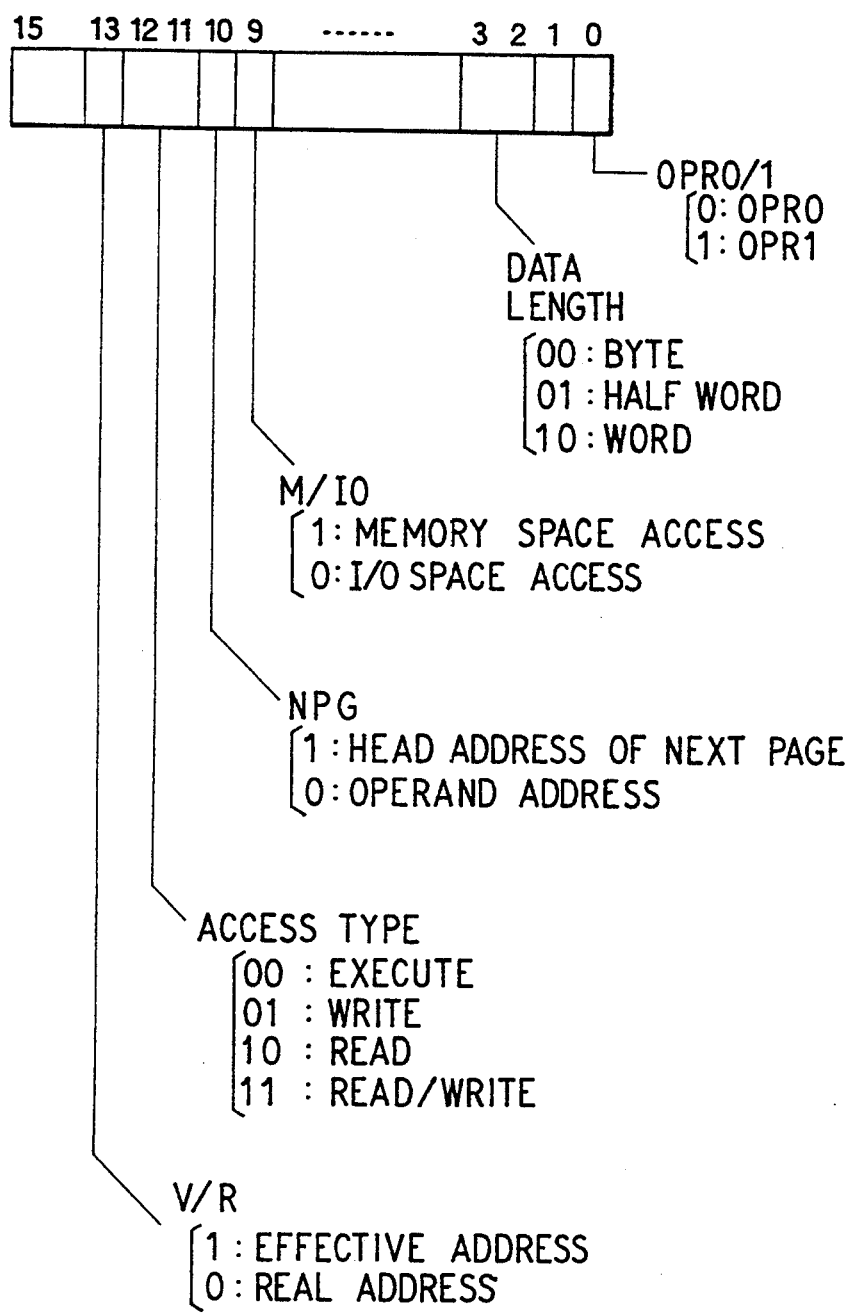
FIG. 16 illustrates another example of the tag information.

In this case, the tag information includes several items of data as shown in FIG. 16. As seen from comparison between FIGS. 12 and 16, the tag information of this case includes, in addition to the tag information shown in FIG. 12, a bit 0 (OPR0/1) indicating to which of the registers OPR1 and OPR1 the data read from the memory by the control unit 122 should be stored. When the OPR0/1 bit is "0", it is designated that the data read from the memory by the main memory control unit 122 is stored in the register OPR0. On the other hand, the OPR0/1 bit of "1", indicates that the data read from the memory by the main memory control unit 122 is stored in the register OPR1.

Now, explanation will be made on operation of the above mentioned CPU when it executes an instruction having an operand for a memory or I/O space access.

When the instruction analyzer 120 has analyzed a given instruction, it supplies the information required for an effective address computation (the values of the general purpose register such as the index value, the displacement value, etc.) through the E bus 90 and the I bus 92 to the registers EATR 1, EATR 2, EATR 3 and EATR 4. The tag information of the operand (such as the access type, data length, M/IO signal, OPR0/1 information) is fed to the TAGR 110.

When the decoding has been completed, the decoded information (the microprogram start address, the first operand register address, the second operand register address, the IOTGQ information, and the valid bit) is stored in the register IDQ and then supplied to the execution unit 124. In the case of a memory operand, either the register OPR0 or OPR1 is designated in accordance with the first and second operand addresses of the decoded information in order to cause the designated register OPR0 or OPR1 to store the data read from the memory by the main memory control unit 122. If the effective address computation unit 80A generates the IOTGQ signal of "1", indicating an I/O access instruction or the memory mapped I/O instruction, the analyzer 120 brings the IOTGQ of the decoded information IDQ to "1".

When the STEA signal from the instruction analyzer 120 is brought into "1", the effective address computation unit 80A computes an effective address by cooperation of the carry save adder CSA 94 and the carry propagate adder CPA 98 on the data stored in the EATR 1, EATR 2, EATR 3 and EATR 4. The effective address is stored in the register OPAR 100. Then, the tag information in the TAGR 110 and the effective address in the OPAR 100 are concurrently supplied through the tag bus 66 and the address bus 54 to the TLB 50.

The effective address (virtual address) fed from the effective address computation unit 80A is stored in the register VAR 52 of the TLB 50. The virtual page number portion stored in the VAR 52 (bits 12-31 of VAR) is compared with each of the virtual page numbers stored in the virtual address memory 56. If the page number consistent with that of the VAR 52 is found, the entry of the data memory 60 corresponding to the coincidence page number is read out to the register RAR 62. The real page number stored in the RAR 62 (bits 12-31 of RAR) is combined with the page offset of the virtual address stored in the VAR 52 (bits 0-11 of VAR), so that the real address is formed and then supplied through the address bus 54 to the main memory control unit 122.

On the other hand, the protection information in the RAR 62 (bits 2-11 of RAR) is supplied to the protection check circuit 70. This circuit 70 also receives the access type information from the decoder 68 and the execution level information from the instruction execution unit 124, and detects whether or not the access is proper. If the protection exception is detected, the circuit 70 supplies the protection error signal to the instruction execution unit 124.

MPIO information in the RAR 62 (bit 0 of RAR) is fed to the I/O access discrimination circuit 72. When the MPIO information is "1", the circuit 72 changes the M/IO information from the TTAGR 64 to "0" which indicates the I/O space, so that the M/IO information of "0" is fed to the main memory control unit 122. Further, when the MPIO information is "1", the circuit 72 supplies the IOAC signal of "1" to the effective address computation unit 80A, thereby to notify that the mode is the memory mapped I/O.

The information stored in the TTAGR 64 is supplied through the tag bus 66 to the main memory control unit 122, simultaneously with application of the real address to the main memory control unit 122. At this time, in the case of memory mapped I/O, the M/IO information is changed to "0" indicating the I/O space access. In addition, the V/R information (indicating whether the data on the address bus is the virtual address or the real address) is brought into "0" indicative of the real address. This V/R information is supplied through the tag bus 66 to the main memory control unit 122.

The main memory control unit 122 receives the real address and the tag information thus supplied. If the access type of the tag information indicates "READ" and the OPR0/1 information is "0", the control unit 122 stores the real address in a register RRAR0 and the tag information in a register RTAGR0, respectively. If the access type is "READ" and the OPR0/1 is "1", the real address and the tag information are stored in registers RRAR1 and RTAGR1, respectively. If the access type is "WRITE", the real address and the tag information are stored in registers RWAR and WTAGR, respectively.

In the case that the tag information in the RTAGR0 has M/IO=1 (memory access) and the access type is "READ", the memory access is started so that the read data is stored in the OPR0. Further, the OPRORDY signal of "1" is fed to the instruction execution unit 124. On the other hand, in the case of M/IO=0 (I/O access) and the access type is READ, the control unit 122 waits until the IOSTART0 signal becomes "1", and at IOSTART0="1", the control unit 122 starts to access to the I/O space. The read data is stored in the OPR0, and the OPRORDY signal of "1" is fed to the instruction execution unit.

Similarly, in the case that the tag information in the RTAGR1 has M/IO=1 (memory access) and the access type is "READ", the memory access is started so that the read data is stored in the OPR1. Further, the OPRORDY signal of "1" is fed to the instruction execution unit 124. On the other hand, in the case of M/IO=0 (I/O access) and the access type=READ, the control unit 122 waits until the IOSTART1 signal becomes "1", and at IOSTART="1", the control unit 122 starts to access to the I/O space. The read data is stored in the OPR1, and the OPRORDY signal of "1" is fed to the instruction execution unit.

When the valid bit "V" of the decoded information IDQ becomes "1", the instruction execution unit 124 starts the execution of an instruction, and if the first operand register number indicates the register OPR0, it reads the OPR0 when the OPRORDY signal has become "1". On the other hand, if the register OPR1 is designated, it reads the OPR1 when the OPRIRDY signal has become "1". As regards the second operand, a similar operation is carried out. If the second operand register number is "OPW", as soon as the data to be written has been prepared, that data is written in the register OPW and then fed to the main memory control unit 122.

Operation of each unit has been explained. Next, the whole operation will be explained with reference to timing charts shown in FIGS. 17, 18 and 19. Incidentally, as regards the writing of the memory operand and the writing the I/O operand, it can be said without exception that after the instruction execution unit prepares the data to be written, the main memory control unit starts the write operation, and therefore, explanation will be omitted.

Figure 17:
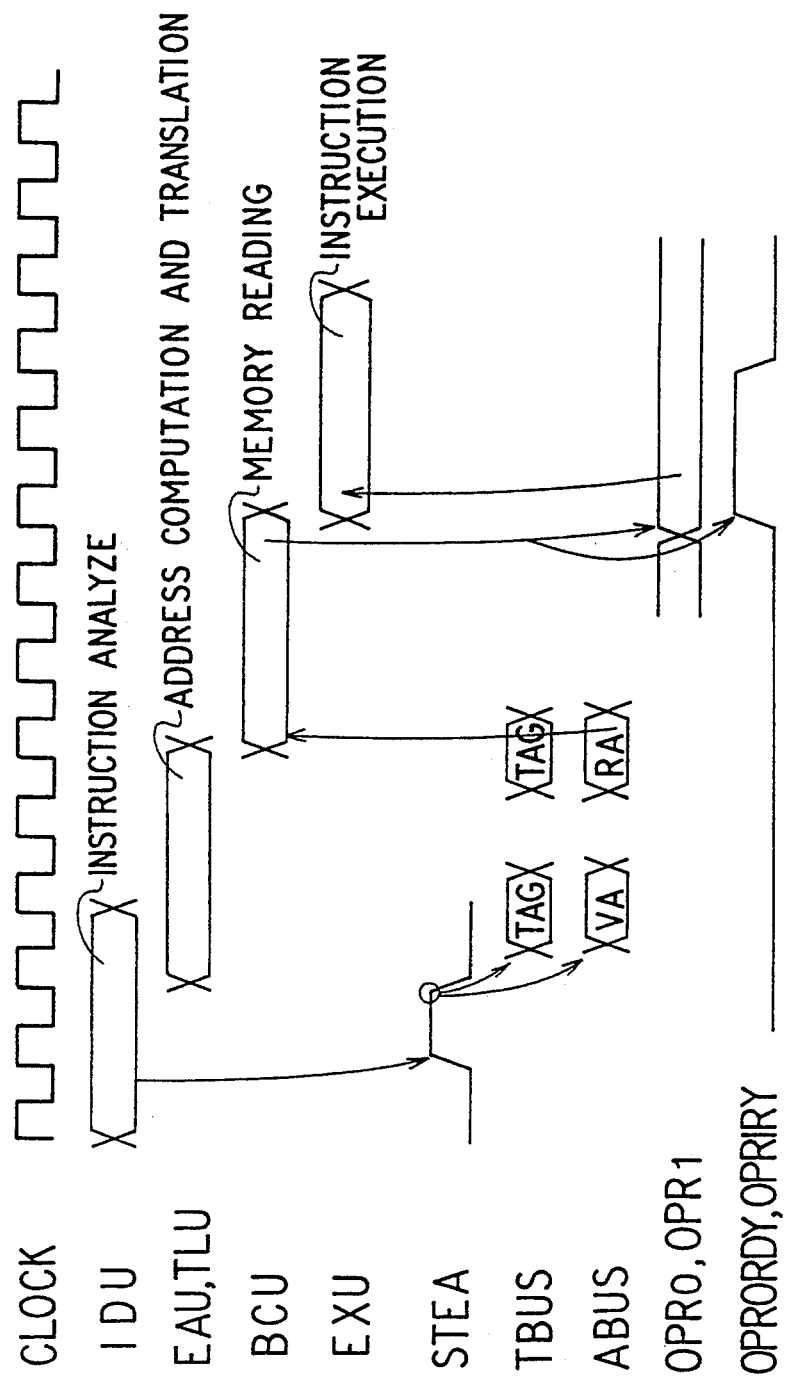
FIGS. 17, 18 and 19 are timing charts illustrating the operation of the CPU shown in FIG. 14.

MEMORY OPERAND READING (FIGS. 14 and 17)

The instruction analyzer 120 decodes a given instruction and transfers the displacement value, the index value and the base value required for computation of the effective address for a memory operand, through the E bus 90 and the I bus 92 to the registers EATR 1 to EATR 4. When the STEA signal from the analyzer 120 becomes "1", the effective address computation unit 80A starts the effective address computation. After completion of the effective address computation, it is transferred through the address bus 54 to the TLB 50. In addition, the tag information of the memory operand (the access type, the data type or length, the OPR0/1 information, M/IO information, etc.) is transferred from the analyzer 120 to the TLB 50. This tag information is transferred through the tag bus 66 to the TLB 50, concurrently with the transfer of the effective address. On the other hand, when the decoding of the instruction is completed, the decoded information is transferred to the register IDQ and then supplied to the execution unit 124.

With reference to the effective addresss thus supplied, the TLB 50 reads the corresponding real page number, the associated protection information and the memory mapped I/O information MPIO. Further, the TLB 50 generates the real address from the read page number and the page offset of the effective address. The real address is transferred through the address bus 54 to the main memory control unit 122. At the same time, the V/R signal of the tag information is brought into "0" indicative of the real address, and the tag information thus modified is transferred through the tag bus 66 to the main memory control unit 122.

The main memory control unit 122, which receives the real address and the tag information thus transferred, operates to store the real address and the tag information in the registers RRAR0, and RTAGR0, respectively, when the OPR0/1 information is "0". But, if the OPR0/1 information is "1", the real address is stored in the register RRAR1 and the tag information is stored in the register RTAG1.

In this condition, if MPI0="1" (memory access), the main memory control circuit 122 immediately starts the memory access to read the data from the memory. In the case of memory access responding to the registers RRAR0 and RTAGR0, the read data is stored in the register OPR0, and the OPR0RDY signal is brought to "1" and then is fed to the execution unit 124. In the case of memory access in accordance with the registers RRAR1 and RTAGR1, the read data is stored in the register OPR1 and the OPR1RDY signal is brought to "1" and then transferred to the execution unit 124.

The execution unit 124 receives the decoded information of the instruction from the register IDQ. If the first or second operand is a memory operand, the register number of that first or second operand indicates the register OPR0 or OPR1. At this time, accordingly, the execution unit 124 can read the data from that register OPR0 or OPR1, but delays the reading operation until a necessary condition is fulfilled. Namely, in the case of reading the register OPR0, the execution unit reads the register OPR0 when the OPR0RDY signal has become "1". On the other hand, in the case of reading the register OPR1, the execution unit reads the register OPR1 when the OPR1RDY signal has become "1".

In the case of the above mentioned memory operand reading, the main memory control unit operates ahead of the execution unit 124, and therefore, when the execution unit 124 starts the execution of the instruction, the OPR0RDY or OPR1RDY signal has already been brought to "1" and the memory data is already stored in the register OPR0 or OPR1.

Figure 18:
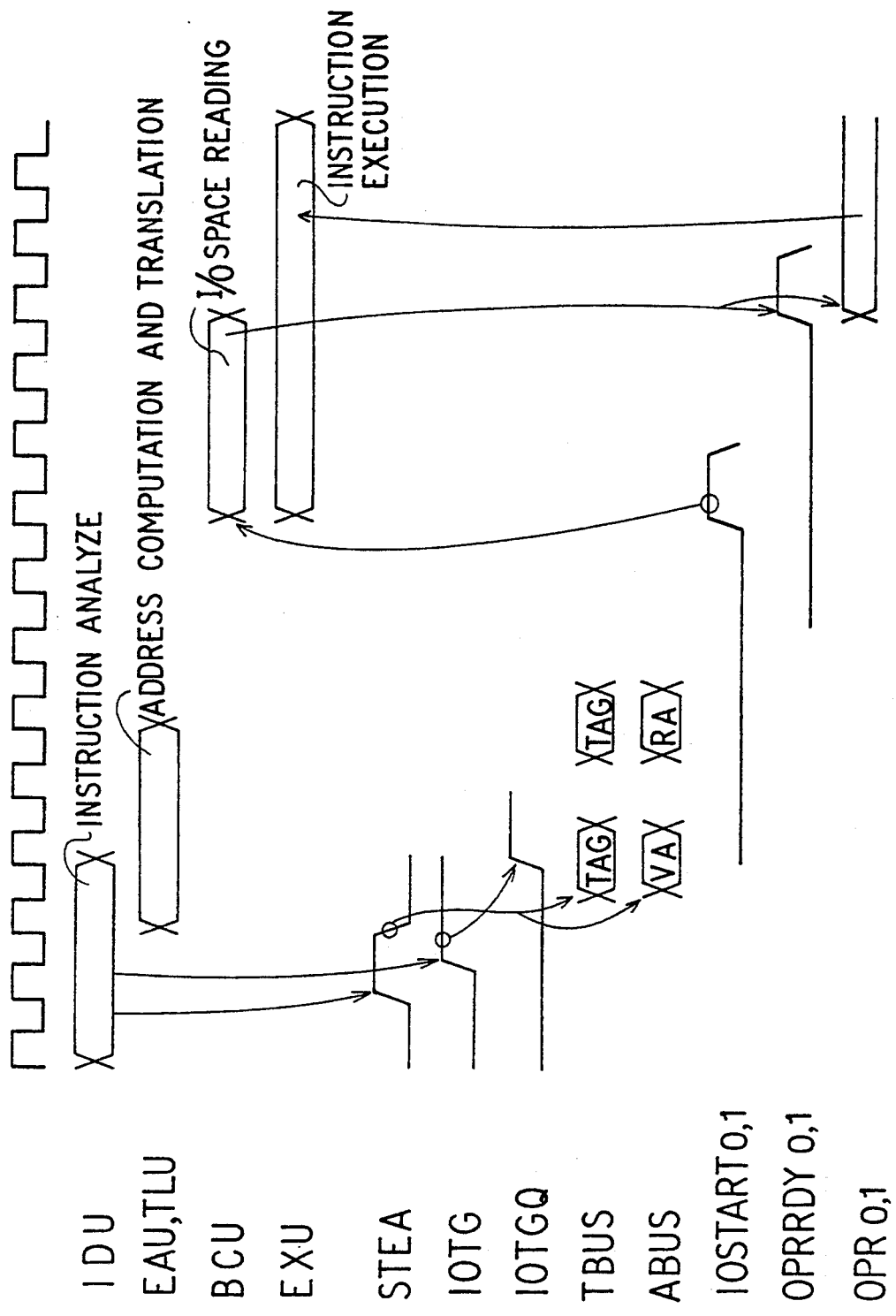

I/O OPERAND READING (FIGS. 14 and 18)

The instruction analyzer 120 decodes a given instruction and transfers the displacement value, the index value and the base value required for computation of the effective address for a memory operand, through the E bus 90 and the I bus 92 to the registers EATR 1 to EATR 4. When the STEA signal from the analyzer 120 becomes "1", the effective address computation unit 80A starts the effective address computation. After completion of the effective address computation, it is transferred through the address bus 54 to the TLB 50. In addition, the tag information of the memory operand (the access type, the data type or length, the OPR0/1 information, M/IO information, etc.) is transferred from the analyzer 120 to the TLB 50. The effective address computation unit 80A operates to transfer this tag information through the tag bus 66 to the TLB 50, concurrently with the transfer of the effective address. At this time, if the M/IO information contained in the tag is "0" indicative of the I/O operand, the signal IOTG is brought to "1" and then transferred to the instruction analyzer 120.

The instruction analyzer 120 responds to the IOTG signal of "1" to bring the IOTGQ signal of the decoded information IDQ to "1". In addition, when the instruction has been decoded, the analyzer 120 transfers the decoded information, excluding the IOTGQ signal, to the register IDQ, and the decoded information in the register IDQ is then transferred to the execution unit.

The TLB 50, which receives the effective address supplied as mentioned above, reads the corresponding real page number, the associated protection information and the memory mapped I/O information MPI0. Further, the TLB 50 generates the real address from the real page number and the page offset of the effective address. The real address is transferred through the address bus 54 to the main memory control unit 122. At the same time, the V/R signal of the tag information is brought into "0" indicative of the real address, and the tag information thus modified is transferred through the tag bus 66 to the main memory control unit 122.

The main memory control unit 122, which receives the real address and the tag information thus transferred, operates to store the real address and the tag information in the registers RRAR0, and RTAGR0, respectively, when the OPR0/1 information is "0". But, if the OPR0/1 information is "1", the real address and the tag information are stored in the registers RRAR1 and RTAGR1, respectively.

After the real address and the tag information are stored in the registers RRAR0 and RTAGR0 or RRAR1 and RTAGR1, if MPIO=0 (I/O access), the I/O access to the registers RRAR0 and RTAGR0 is delayed until the IOSTART0 signal from the execution unit 124 becomes "1". When the IOSTART0 signal becomes "1", the I/O access is started. At this time, the read data is stored in the register OPR0, and the OPR0RDY signal is brought to "1" and then is fed to the execution unit 124. Similarly, the I/O access to the registers RRAR1 and RTAGR1 is delayed until the IOSTART1 signal from the execution unit 124 becomes "1". When the IOSTART1 signal becomes "1", the I/O access is started. At this time, the read data is stored in the register OPR1, and the OPR1RDY signal is brought to "1" and then is fed to the execution unit 124. Similarly, the execution unit 124 receives the decoded information of the instruction from the register IDQ. If the first or second operand is an I/O operand, the register number of that first or second operand indicates the register OPR0 or OPR1. At this time, the IOTGQ signal is "1". When the execution unit 124 tries to read the register OPR0 (or OPR1), if IOTGQ="1", the execution unit 124 delays the reading of the register OPR0 until it brings the IOSTART0 signal to "1" and then the OPR0RDY signal is brought to "1". When the OPR0RDY signal is brought to "1", the register OPR0 is read out. On the other hand, in the case of reading the register OPR1, the execution unit 124 delays the reading of the register OPR1 until it brings the IOSTART1 signal to "1" and then the OPR1RDY signal is brought to "1". When the OPR1RDY signal is brought to "1", the register OPR1 is read out.

Figure 19:
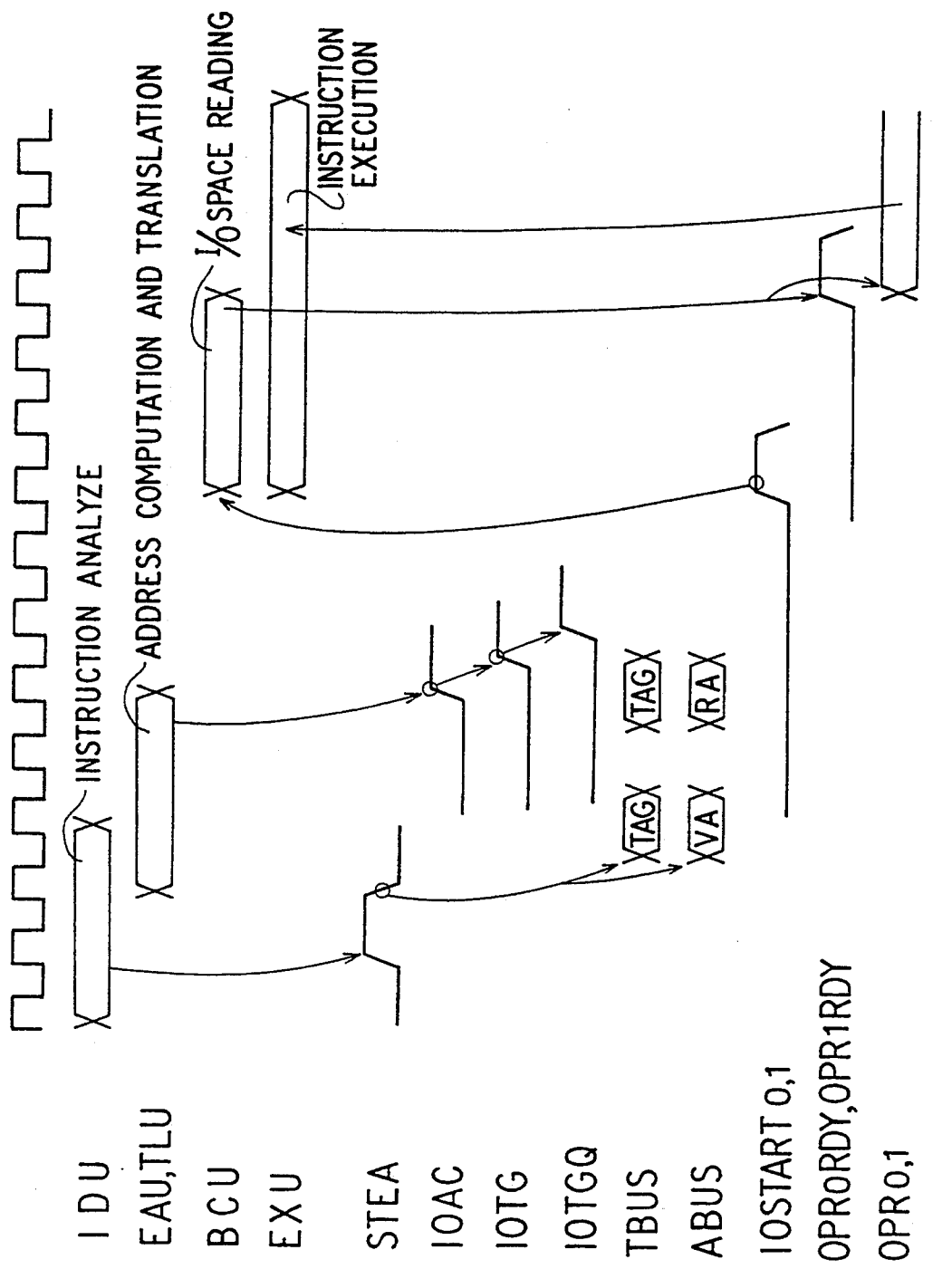

MEMORY MAPPED I/O READING (FIGS. 14 and 19)

In this case, the instruction analyzer 120 operates similarly to the case of the I/O operand reading. In addition, the address computation operation of the effective address computation unit is similar to the case of the I/O operand reading. After the read address and the tag information are transferred to the TLB 50, the TLB 50 outputs the IOAC signal of "1" to the effective address computation unit in the case of the memory mapped I/O. In response to the IOAC signal of "1", the effective address computation unit changes the IOTG signal to "1" and outputs it to the instruction analyzer 120, which then operates to transfer the IOTGQ signal of "1" to the execution unit 124.

If the TLB 50 receives the effective address and the tag information, the TLB 50 reads the corresponding real page number, the associated protection information and the memory mapped I/O information MPI0. Here, if MPI0=1 (memory mapped I/O), the TLB brings the IOAC signal to "1" and outputs it to the effective address computation unit.

The main memory control unit 122 and the instruction execution unit 124 will operate similarly to the case of the I/O operand reading.

As seen from the above, in the case of I/O access (memory mapped I/O or I/O access operand), the main memory control unit operates to carry out the reading after receiving an acknowledge signal from the execution unit. Therefore, even if the CPU adopts the pipelined architecture, the CPU will not malfunction.

The invention has thus been shown and described with reference to specific embodiments. However, it should be noted that the invention is in no way limited to the details of the illustrated structures but changes and modifications may be made within the scope of the appended claims.

We claim:

1. A data processor with memory mapped input/output structure in which a portion of an address space is allocated to a main memory and another portion of the address space is allocated to a plurality of external input/output devices and which includes at least a central processing unit adapted to execute virtual memory management, wherein the improvement comprises:
   a) address translation means, internally provided in the central processing unit, for translating a given virtual address into a corresponding real address;
   b) means, associated with the address translation means and internally provided in the central processing unit, for generating a distinction signal indicating whether the translated real address designates said main memory or one of said external input/output devices, the distinction signal also directly specifying the specific one of said external input/output devices to be accessed when the translated real address designates one of said external input/output devices; and
   c) means, which is internally provided in the central processing unit and which receives the distinction signal, for generating a set of input/output control signals to directly access said external input/output devices.

2. A data processor as claimed in claim 1 wherein the address translation means includes a translation lookaside buffer adapted to store a plurality of data sets, each of which contains: one virtual address; a corresponding real address; and access distinction information, which indicates whether the real address is allocated to the main memory or an external input/output device, and which is used to directly determine whether or not the virtual address indicates access to an external input/output device.

3. A data processor as claimed in claim 2 wherein the translation lookaside buffer has an input for receiving the given virtual address, a first output for supplying a corresponding real address, and a second output for the distinction signal; the translation lookaside buffer also having a plurality of blocks each of which includes a virtual address data register, a comparator having a first input coupled to the virtual address data register and a second input coupled to the input of the translation lookaside buffer, a real address register coupled through a first transfer gate to the first output of the translation lookaside buffer, and a distinction information register coupled through a second transfer gate to the second output of the translation lookaside buffer, the first and second transfer gates being turned on when the associated comparator detects coincidence between the first and second input thereof.

4. A data processor as claimed in claim 1, wherein the external input/output device need not be capable of functioning as an external memory.

5. A data processor with memory mapped input/output structure in which a portion of an address space is allocated to a main memory and another portion of the address space is allocated to at least one external input/output device and which comprises:
   a) an instruction execution unit coupled to an address bus;
   b) an instruction analyzer, which receives a given instruction and outputs to the instruction execution unit a decoded instruction which can be executed by the instruction execution unit, and which generates information necessary for calculation of the effective address of an operand;
   c) an effective address calculation unit, which receives the information from the instruction analyzer, for generating an effective address;
   d) an address transformation unit which receives the effective address and generates a real address; and
   e) a main memory coupled to receive the real address from the address transformation unit and also coupled to send read data to the instruction execution unit;

where the address transformation unit includes a translation lookaside buffer adapted to store a plurality of data sets, each of which contains: one virtual address; a corresponding real address; and access distinction information, which indicates whether the real address is allocated to the main memory or an external input/output device, and which is used to directly determine whether or not the virtual address indicates access to an external input/output device.

6. A data processor as claimed in claim 5 wherein the translation lookaside buffer has an input for receiving the given virtual address, a first output for supplying a corresponding real address, and a second output for the access distinction information; the translation lookaside buffer also having a plurality of blocks each of which includes a virtual address data register, a comparator having a first input coupled to the virtual address data register and a second input coupled to the input of the translation lookaside buffer, a real address register coupled through a first transfer gate to the first output of the translation lookaside buffer, and an access distinction information register coupled through a second transfer gate to the second output of the translation lookaside buffer, the first and second transfer gates being turned on when the associated comparator detects coincidence between the first and second input thereof.

7. A data processor as claimed in claim 5 wherein the translation lookaside buffer includes:
 a) a first temporary register for holding the effective address including a page number and an offset;
 b) a virtual address memory and comparator coupled to receive the page number from the first temporary register in order to compare the received page number with virtual page numbers stored therein, so as to output an entry for a consistent page number;
 c) a real address memory, which receives the entry for a consistent page number, for generating a real address;
 d) an output register, which receives the real address from the real address memory and the offset from the first temporary register, for outputting a combined real address to the address bus;
 e) a second temporary register for holding tag information that is fed simultaneously with the sending of the effective address to the first temporary register;
 f) a decoder, coupled to the second temporary register, for generating a distinction signal indicating whether the access is an access to the main memory or an access to an external input/output device; and
 g) an input/output access discrimination circuit, which receives the distinction signal, for generating an input/output access signal.

8. A data processor as claimed in claim 5, where the external input/output device need not be capable of functioning as an external memory.

* * * * *